(12) United States Patent
Suryadi et al.

(10) Patent No.: US 12,468,866 B2
(45) Date of Patent: Nov. 11, 2025

(54) DRILLSTRING ASSEMBLY FRAMEWORK

(71) Applicant: Schlumberger Technology Corporation, Sugar Land, TX (US)

(72) Inventors: Hendrik Gunawan Suryadi, Beijing (CN); Paul Bolchover, Beijing (CN); Tao Yu, Beijing (CN); Chao Mu, Beijing (CN); Yun Ma, Beijing (CN); Xi Chen, Beijing (CN)

(73) Assignee: Schlumberger Technology Corporation, Sugar Land, TX (US)

(*) Notice: Subject to any disclaimer, the term of this patent is extended or adjusted under 35 U.S.C. 154(b) by 271 days.

(21) Appl. No.: 16/497,792

(22) PCT Filed: May 3, 2017

(86) PCT No.: PCT/CN2017/082848
§ 371 (c)(1),
(2) Date: Sep. 25, 2019

(87) PCT Pub. No.: WO2018/201314
PCT Pub. Date: Nov. 8, 2018

(65) Prior Publication Data
US 2020/0104544 A1    Apr. 2, 2020

(51) Int. Cl.
*G06F 30/20*    (2020.01)
*E21B 10/00*    (2006.01)
(Continued)

(52) U.S. Cl.
CPC .............. *G06F 30/20* (2020.01); *E21B 10/00* (2013.01); *E21B 44/00* (2013.01); *G06F 3/0482* (2013.01)

(58) Field of Classification Search
CPC ........ G06F 30/20; G06F 3/0482; E21B 10/00; E21B 44/00; E21B 7/00; E21B 41/00
See application file for complete search history.

(56) References Cited

U.S. PATENT DOCUMENTS

| 2,671,346 A | 3/1954 | Banning, Jr. |
| 5,305,836 A | 4/1994 | Holbrook et al. |

(Continued)

FOREIGN PATENT DOCUMENTS

| CN | 104508240 A | 4/2015 |
| CN | 106437513 A | 2/2017 |

(Continued)

OTHER PUBLICATIONS

Guria, Chandan, Kiran K. Goli, and Akhilendra K. Pathak. "Multi-objective optimization of oil well drilling using elitist non-dominated sorting genetic algorithm." Petroleum Science 11.1 (2014): 97-110.*

(Continued)

*Primary Examiner* — Eunhee Kim
(74) *Attorney, Agent, or Firm* — Jeffrey D. Frantz

(57) ABSTRACT

A method can include receiving well plan information for drilling at least a section of a well at a site; generating a set of candidate drillstring assemblies based at least in part on at least a portion of the well plan information and drillstring assembly component information; generating a proposed set of drillstring assemblies with performance indexes based at least in part on the set of candidate drillstring assemblies and engineering analysis information associated with the site; and generating a final drillstring assembly based at least in part on the proposed set of drillstring assemblies and the performance indexes.

20 Claims, 14 Drawing Sheets

(51) Int. Cl.
*E21B 44/00* (2006.01)
*G06F 3/0482* (2013.01)

(56) References Cited

U.S. PATENT DOCUMENTS

| | | |
|---|---|---|
| 5,312,163 A | 5/1994 | Hanamoto et al. |
| 5,794,720 A | 8/1998 | Smith et al. |
| 6,109,368 A | 8/2000 | Goldman et al. |
| 6,233,498 B1 | 5/2001 | King et al. |
| 6,269,892 B1 | 8/2001 | Boulton et al. |
| 6,353,799 B1 | 3/2002 | Meany et al. |
| 6,408,953 B1 | 6/2002 | Goldman et al. |
| 6,424,919 B1 | 7/2002 | Moran |
| 6,438,495 B1 | 8/2002 | Chau et al. |
| 6,516,293 B1 | 2/2003 | Huang et al. |
| 6,612,382 B2 | 9/2003 | King |
| 6,749,029 B2 | 6/2004 | Alft et al. |
| 6,785,641 B1 | 8/2004 | Huang |
| 6,873,947 B1 | 3/2005 | Huang et al. |
| 6,968,909 B2 | 11/2005 | Aldred et al. |
| 7,020,597 B2 | 3/2006 | Oliver et al. |
| 7,139,689 B2 | 11/2006 | Huang |
| 7,464,013 B2 | 12/2008 | Huang et al. |
| 7,546,884 B2 | 6/2009 | Veeningen et al. |
| 7,693,695 B2 | 4/2010 | Huang et al. |
| 7,844,426 B2 | 11/2010 | Huang |
| 7,953,586 B2 | 5/2011 | Chen et al. |
| 8,099,266 B2 * | 1/2012 | Burge ............... G06F 30/13 703/10 |
| 8,401,831 B2 | 3/2013 | Tang et al. |
| 9,482,055 B2 | 11/2016 | Huang |
| 9,598,947 B2 * | 3/2017 | Wang ............... E21B 44/00 |
| 10,221,671 B1 | 3/2019 | Zhang |
| 10,400,547 B2 | 9/2019 | Chen et al. |
| 11,499,409 B2 | 11/2022 | Suryadi et al. |
| 2001/0042642 A1 | 11/2001 | King |
| 2002/0050989 A1 | 5/2002 | Sanstrom |
| 2002/0138240 A1 | 9/2002 | Jelley et al. |
| 2002/0177955 A1 | 11/2002 | Jalali et al. |
| 2003/0015351 A1 | 1/2003 | Goldman et al. |
| 2004/0000430 A1 | 1/2004 | King |
| 2004/0143427 A1 | 7/2004 | Huang et al. |
| 2004/0149431 A1 | 8/2004 | Wylie et al. |
| 2004/0256152 A1 | 12/2004 | Dashevskiy et al. |
| 2005/0096847 A1 | 5/2005 | Huang |
| 2005/0197777 A1 | 9/2005 | Rodney et al. |
| 2005/0205300 A1 | 9/2005 | Mathiszik |
| 2005/0273302 A1 | 12/2005 | Huang et al. |
| 2006/0195307 A1 | 8/2006 | Huang et al. |
| 2006/0272861 A1 | 12/2006 | Hutchinson |
| 2007/0067147 A1 | 3/2007 | Huang |
| 2007/0192071 A1 | 8/2007 | Huang et al. |
| 2008/0255817 A1 | 10/2008 | Pabon et al. |
| 2008/0262810 A1 * | 10/2008 | Moran ............... E21B 7/00 703/10 |
| 2009/0204245 A1 | 8/2009 | Sustaeta et al. |
| 2010/0032165 A1 * | 2/2010 | Bailey ............... E21B 41/00 703/2 |
| 2011/0214878 A1 | 9/2011 | Bailey et al. |
| 2013/0186687 A1 | 7/2013 | Snyder |
| 2014/0351183 A1 * | 11/2014 | Germain ............ E21B 44/00 706/12 |
| 2015/0198014 A1 * | 7/2015 | Servaes ............. E21B 10/00 703/2 |
| 2015/0330209 A1 | 11/2015 | Panchal |
| 2015/0337640 A1 * | 11/2015 | Huang ............... G06F 30/20 703/10 |
| 2016/0047206 A1 | 2/2016 | Vempati et al. |
| 2017/0306740 A1 * | 10/2017 | Song ............... E21B 4/02 |
| 2018/0087321 A1 * | 3/2018 | Johnston ........... G05B 19/02 |
| 2019/0048706 A1 | 2/2019 | Benson et al. |
| 2019/0048707 A1 | 2/2019 | Benson et al. |
| 2019/0102676 A1 | 4/2019 | Nazari |
| 2019/0145240 A1 | 5/2019 | Benson et al. |
| 2019/0284909 A1 | 9/2019 | Spencer |
| 2020/0370409 A1 | 11/2020 | Yu |
| 2021/0148213 A1 | 5/2021 | Madasu et al. |
| 2021/0312332 A1 | 10/2021 | Panchal |
| 2023/0124120 A1 | 4/2023 | Yu et al. |

FOREIGN PATENT DOCUMENTS

| | | | |
|---|---|---|---|
| EP | 1146200 A1 | 10/2001 | |
| EP | 1335108 A2 | 8/2003 | |
| GB | 2290330 A | 12/1995 | |
| GB | 2367843 A | 4/2002 | |
| WO | 0050735 A1 | 8/2000 | |
| WO | 03072907 A1 | 9/2003 | |
| WO | 2010101473 A1 | 9/2010 | |
| WO | 2011010099 A1 | 1/2011 | |
| WO | 2012170273 A1 | 12/2012 | |
| WO | WO-2013192524 A2 * | 12/2013 | ............... E21B 7/10 |
| WO | 2015/200259 A1 | 12/2015 | |
| WO | 2016154723 A1 | 10/2016 | |
| WO | 2020191360 A1 | 9/2020 | |

OTHER PUBLICATIONS

Guria, Chandan, Kiran K. Goli, and Akhilendra K. Pathak. "Multi-objective optimization of oil well drilling using elitist non-dominated sorting genetic algorithm." Petroleum Science 11.1 (2014): 97-110. (Year: 2014).*
Dvoinikov MV. Research on technical and technological parameters of inclined drilling. Journal of Mining Institute. Feb. 26, 2017;223: 86-. (Year: 2017).*
Okafor, Zimuzor, et al. "Application of Tandem Rotary Steerable-Positive Displacement Motor Bottom Hole Assembly in Drilling Horizontal Wells: Case Study of Three Eastern Siberia Wells." SPE/IADC Drilling Conference and Exhibition. SPE, 2011. 23 Pages. (Year: 2011).*
Bello, Opeyemi, et al. "Application of artificial intelligence methods in drilling system design and operations: a review of the state of the art." Journal of Artificial Intelligence and Soft Computing Research 5.2 (2015): 121-139. (Year: 2015).*
European Search Report mailed on Nov. 25, 2020 for the equivalent patent 17908204.5-1005 (PCT/CN2017/082848).
Supplemental Search Report mailed on Dec. 15, 2020 for the equivalent patent 17908204.5-1005 (PCT/CN2017/082848).
International Search Report and Written Opinion for the equivalent International patent application PCT/CN2017/082848 mailed on Jan. 19, 2018.
International Preliminary Report on Patentability for the counterpart International patent application PCT/CN2017/082848 mailed on Nov. 14, 2019.
DeepMind, "Safety-first AI for autonomous data centre cooling and industrial control," retrieved at https://deepmind.com/blog/safety-first-ai-autonomous-data-centre-cooling-and-industrial-control/ on Jan. 27, 2020.
Winih et al., "Asynchronous Methods for Deep Reinforcement learning," Proceedings of the 33rd International Conference on Machine Learning, New York, NY, USA, 2016.
Winih et al., "Human-level control through deep reinforcement learning," Nature vol. 518, pp. 529, Feb. 26, 2015.
OpenAI, "Learning Dexterity," retrieved at https://blog.openai.com/learning-dexterity/ on Jan. 27, 2020.
Pollock et al., "Machine Learning for Improved Directional Drilling," Offshore Technology Conference held in Houston, TX USA, Apr. 30-May 3, 2018.
Office Action received in U.S. Appl. No. 16/776,373 dated Mar. 18, 2021, 20 pages.
International Search Report and Written Opinion of International Patent Application No. PCT/US2020/015529 mailed on Jun. 1, 2020, 10 pages.
International Preliminary Report on Patentability of International Patent Application No. PCT/US2020/015529 mailed on Dec. 2, 2021.
Extended Search Report issued in European Patent Application No. 20810781.3 dated Dec. 22, 2022.

(56) References Cited

OTHER PUBLICATIONS

Lashari, S. et al., "Drilling performance monitoring and optimization: a data-driven approach", Journal of Petroleum Exploration and Production Technology, 2019, 9(4), pp. 2747-2756.
Search Report and Written Opinion of International Patent Application No. PCT/US2022/045200 dated Jan. 12, 2023, 10 pages.
SPE/IADC 67816 Meeting Future Drilling Planning and Decision Support Requirements Copyright 2001, Feb. 27-Mar. 1, 2001.
Bilgesu, H.I., et al., A New Approach for the Prediction of Rate of Penetration (ROP) Values, Society of Petroleum Engineers, Oct. 1997, pp. 175-179, SPE 39231.
Sinor, A. and Warren, T.M., Drag Bit Wear Model, SPE Drilling Engineering, Jun. 1989, pp. 128-136.
Irrangang, R., et al., A Case-Based System to Cut Drilling Costs, Society of Petroleum Engineers, Oct. 1999, pp. 1-17, SPE 56504.
Luo, Y, et al., Flow-Rate Predictions for Cleaning Deviated Wells, IADC/SPE, Feb. 1992, pp. 367-376, SPE 23884.
Bourgoyne, Jr., A., et al., Drilling Hydraulics, Applied Drilling Engineering, 1986, pp. 113-189, First Printing, Society of Petroleum Engineers, Richardson, TX.
International Search Report issued in PCT Application No. PCT/US2005/009119 dated Jul. 6, 2005, 3 pages.
Written Opinion issued in PCT Application No. PCT/US2005/009119 dated Jul. 6, 2005, 5 pages.
International Search Report and Written Opinion issued in corresponding International Application No. PCT/US2014/034053, mailed Aug. 18, 2014 (20 pages).
Kingma, Diederik et al., Adam: A Method for Stochastic Optimization, arXiv:1412.6980, v9, Jan. 30, 2017, 15 pages.
Ba et al., Positive Displacement Motor Modeling: Skyrocketing the Way We Design, Select, and Operate Mud Motors, Society of Petroleum Engineers, SPE-183298-MS, Abu Dhabi International Petroleum Exhibition Conference, Abu Dhabi, UAE, Nov. 7-10, 2016, 26 pages.
Evangelatos, G. I. et al., "Advanced BHA-5 ROP Modeling Including Neural Network Analysis of Drilling Performance Data", IADC/SPE Drilling Conference and Exhibition, 2016, 24 pages.
Wardana, R., "Build Rate Prediction Using Artificial Neural Network for Positive Displacement Motor Application in Field X", Journal Petro, 2018, VII(1), 6 pages.
Yu, Y. et al., "Training an automated directional drilling agent with deep reinforcement learning in a simulated environment", SPE/IADC-204105-MS, prepared for presentation at the SPE/IADC Drilling Conference and Exhibition, 2021, 6 pages.
Wu, K. et al., "Learn to Navigate Autonomously Through Deep Reinforcement Learning", IEEE Transactions on industrial Electronics, 2021, 69(5), pp. 5342-5352.
Rieker, J. D. et al., "An intelligent agent for optimal river-reservoir system management", Water Resources Research, 2021, 48(9), 16 pages.
Lin, Y.-C. et al, "Tactics of Adversarial Attack on Deep Reinforcement Learning Agents", arXiv: 1703.06748v4, 2019, 7 pages.

\* cited by examiner

Method 700

DRILLSTRING ASSEMBLY FRAMEWORK

CROSS REFERENCE TO RELATED APPLICATION(S)

This application is a National Stage entry of International Patent Application No. PCT/CN2017/082848, filed on May 3, 2017.

BACKGROUND

A resource field can be an accumulation, pool or group of pools of one or more resources (e.g., oil, gas, oil and gas) in a subsurface environment. A resource field can include at least one reservoir. A reservoir may be shaped in a manner that can trap hydrocarbons and may be covered by an impermeable or sealing rock. A bore can be drilled into an environment where the bore may be utilized to form a well that can be utilized in producing hydrocarbons from a reservoir.

A rig can be a system of components that can be operated to form a bore in an environment, to transport equipment into and out of a bore in an environment, etc. As an example, a rig can include a system that can be used to drill a bore and to acquire information about an environment, about drilling, etc. A resource field may be an onshore field, an offshore field or an on- and offshore field. A rig can include components for performing operations onshore and/or offshore. A rig may be, for example, vessel-based, offshore platform-based, onshore, etc.

Field planning can occur over one or more phases, which can include an exploration phase that aims to identify and assess an environment (e.g., a prospect, a play, etc.), which may include drilling of one or more bores (e.g., one or more exploratory wells, etc.). Other phases can include appraisal, development and production phases.

SUMMARY

A method can include receiving well plan information for drilling at least a section of a well at a site; generating a set of candidate drillstring assemblies based at least in part on at least a portion of the well plan information and drillstring assembly component information; generating a proposed set of drillstring assemblies with performance indexes based at least in part on the set of candidate drillstring assemblies and engineering analysis information associated with the site; and generating a final drillstring assembly based at least in part on the proposed set of drillstring assemblies and the performance indexes. A system can include a processor; memory accessible by the processor; processor-executable instructions stored in the memory and executable to instruct the system to: receive well plan information for drilling at least a section of a well at a site; generate a set of candidate drillstring assemblies based at least in part on at least a portion of the well plan information and drillstring assembly component information; generate a proposed set of drillstring assemblies with performance indexes based at least in part on the set of candidate drillstring assemblies and engineering analysis information associated with the site; and generate a final drillstring assembly based at least in part on the proposed set of drillstring assemblies and the performance indexes. One or more computer-readable storage media can include processor-executable instructions to instruct a computing system to: receive well plan information for drilling at least a section of a well at a site; generate a set of candidate drillstring assemblies based at least in part on at least a portion of the well plan information and drillstring assembly component information; generate a proposed set of drillstring assemblies with performance indexes based at least in part on the set of candidate drillstring assemblies and engineering analysis information associated with the site; and generate a final drillstring assembly based at least in part on the proposed set of drillstring assemblies and the performance indexes. A system can include a knowledge base component operatively coupled to at least one data storage device where the knowledge base component accesses at least a portion of data in the at least one data storage device and generates candidate bottom hole assemblies for drilling at least a section of a well at a site; a tuning component operatively coupled to at least one processor where the tuning component generates a refined set of bottom hole assemblies as a subset of the candidate bottom hole assemblies based at least in part on simulation results that simulate bottom hole assembly physics in at least a portion of the well at the site; an analysis component operatively coupled to at least one processor where the analysis component generates a set of performance indexes and drilling parameters associated with at least a portion of the refined set of bottom hole assemblies; and a decision component operatively coupled to at least one processor where the decision component selects one of the refined set of bottom hole assemblies as an optimal bottom hole assembly for drilling the section of the well at the site. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

Figure 1:
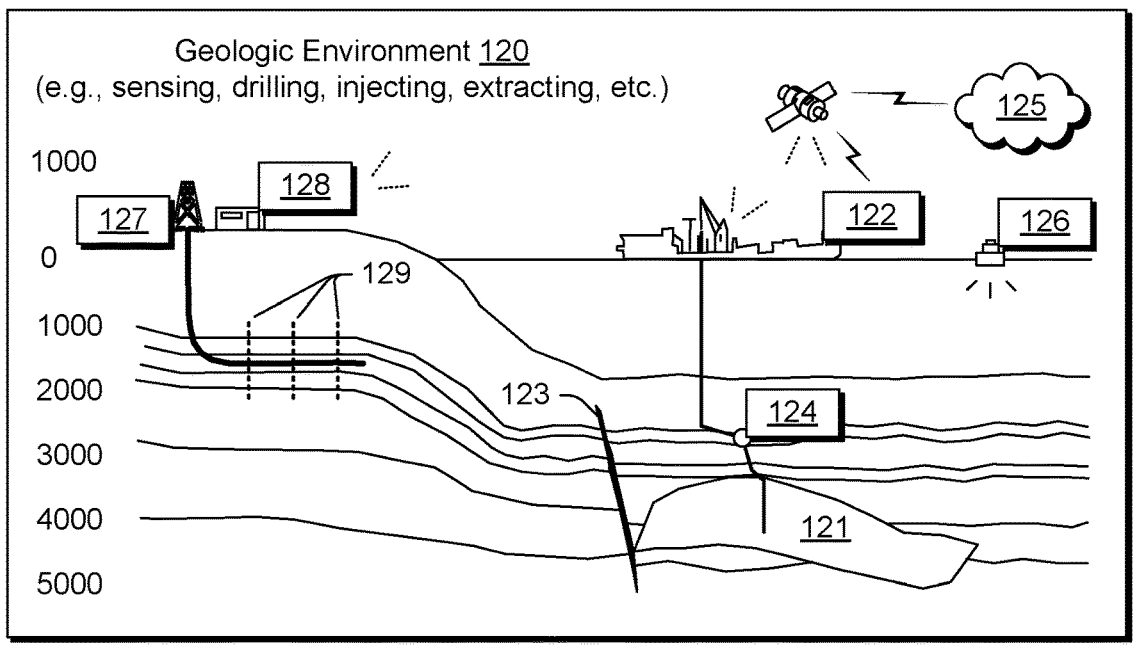
FIG. 1 illustrates examples of equipment in a geologic environment.
Figure 1:
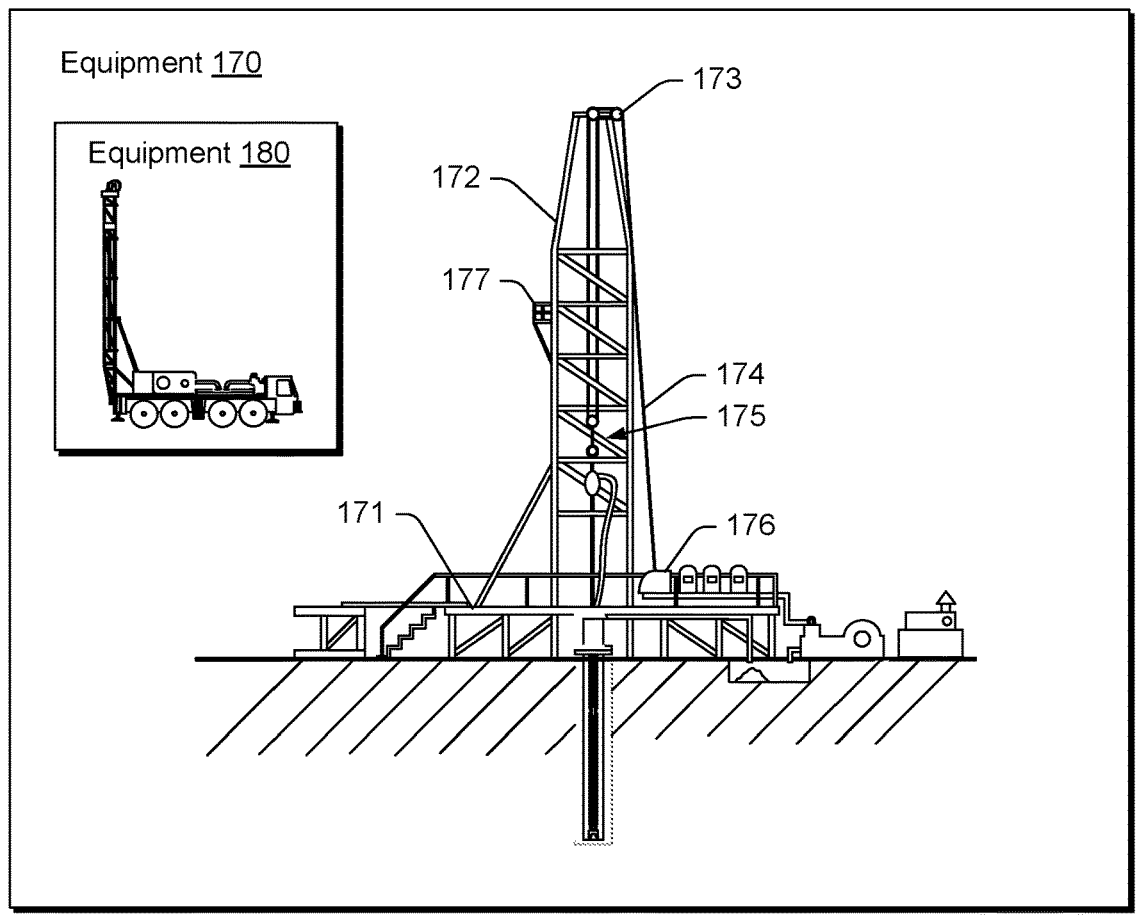

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, a seismic sensing, analysis of seismic data, assessment of one or more fractures, injection, production, etc. As an example, the equipment 127 and/or 128 may provide for measurement, collection, communication, storage, analysis, etc. of data such as, for example, production data (e.g., for one or more produced resources). As an example, one or more satellites may be provided for purposes of communications, data acquisition, etc.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

A derrick can be a structure used to support a crown block and a traveling block operatively coupled to the crown block at least in part via line. A derrick may be pyramidal in shape and offer a suitable strength-to-weight ratio. A derrick may be movable as a unit or in a piece by piece manner (e.g., to be assembled and disassembled).

As an example, drawworks may include a spool, brakes, a power source and assorted auxiliary devices. Drawworks may controllably reel out and reel in line. Line may be reeled over a crown block and coupled to a traveling block to gain mechanical advantage in a "block and tackle" or "pulley" fashion. Reeling out and in of line can cause a traveling block (e.g., and whatever may be hanging underneath it), to be lowered into or raised out of a bore. Reeling out of line may be powered by gravity and reeling in by a motor, an engine, etc. (e.g., an electric motor, a diesel engine, etc.).

As an example, a crown block can include a set of pulleys (e.g., sheaves) that can be located at or near a top of a derrick or a mast, over which line is threaded. A traveling block can include a set of sheaves that can be moved up and down in a derrick or a mast via line threaded in the set of sheaves of the traveling block and in the set of sheaves of a crown block. A crown block, a traveling block and a line can form a pulley system of a derrick or a mast, which may enable handling of heavy loads (e.g., drillstring, pipe, casing, liners, etc.) to be lifted out of or lowered into a bore. As an example, line may be about a centimeter to about five centimeters in diameter as, for example, steel cable. Through use of a set of sheaves, such line may carry loads heavier than the line could support as a single strand.

As an example, a derrickman may be a rig crew member that works on a platform attached to a derrick or a mast. A derrick can include a landing on which a derrickman may stand. As an example, such a landing may be about 10 meters or more above a rig floor. In an operation referred to as trip out of the hole (TOH), a derrickman may wear a safety harness that enables leaning out from the work landing (e.g., monkeyboard) to reach pipe in located at or near the center of a derrick or a mast and to throw a line around the pipe and pull it back into its storage location (e.g., fingerboards), for example, until it a time at which it may be desirable to run the pipe back into the bore. As an example, a rig may include automated pipe-handling equipment such that the derrickman controls the machinery rather than physically handling the pipe.

As an example, a trip may refer to the act of pulling equipment from a bore and/or placing equipment in a bore. As an example, equipment may include a drillstring that can be pulled out of a hole and/or placed or replaced in a hole. As an example, a pipe trip may be performed where a drill bit has dulled or has otherwise ceased to drill efficiently and is to be replaced.

Figure 2:
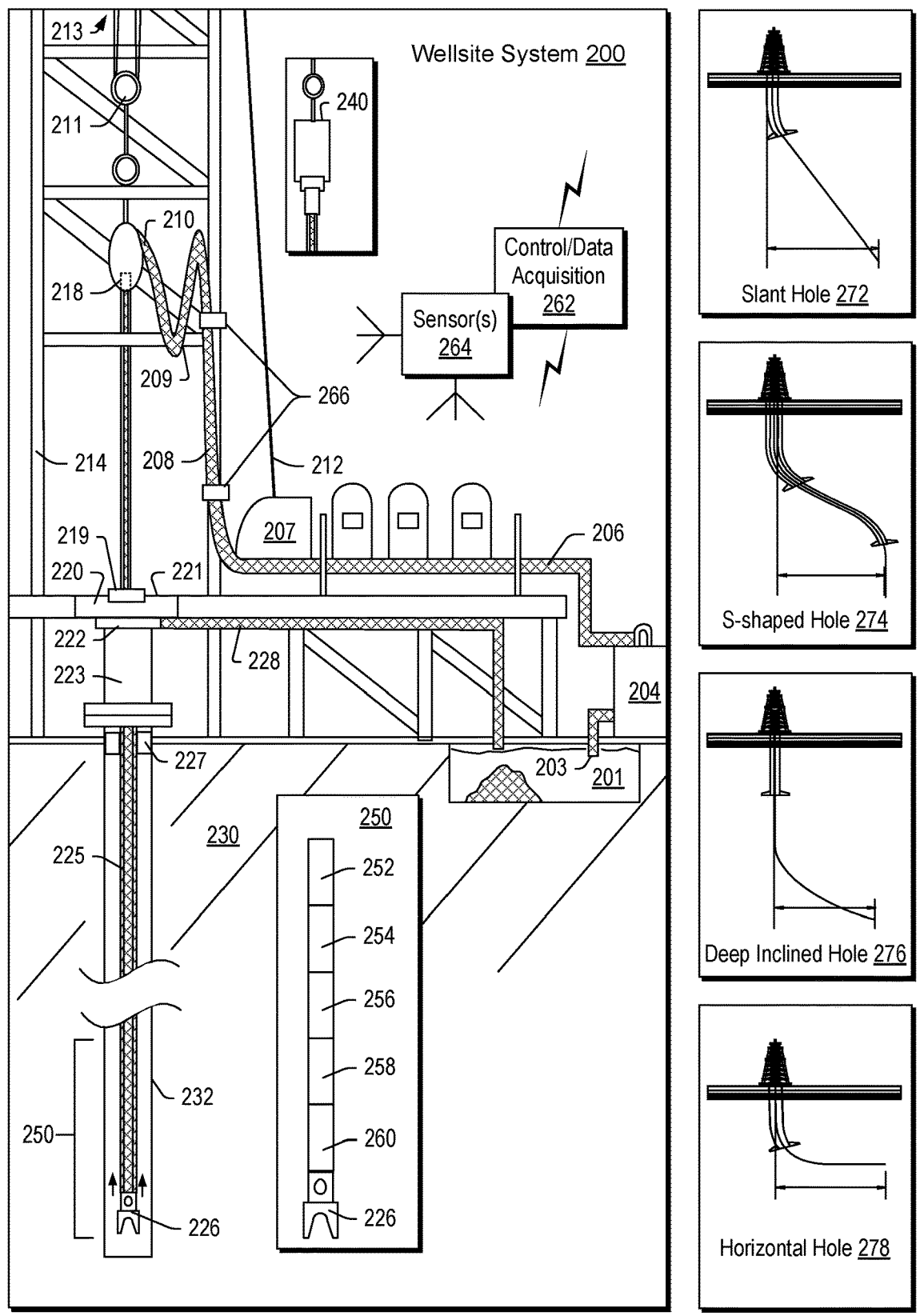
FIG. 2 illustrates examples of equipment and examples of hole types.

FIG. 2 shows an example of a wellsite system 200 (e.g., at a wellsite that may be onshore or offshore). As shown, the wellsite system 200 can include a mud tank 201 for holding mud and other material (e.g., where mud can be a drilling fluid), a suction line 203 that serves as an inlet to a mud pump 204 for pumping mud from the mud tank 201 such that mud flows to a vibrating hose 206, a drawworks 207 for winching drill line or drill lines 212, a standpipe 208 that receives mud from the vibrating hose 206, a kelly hose 209 that receives mud from the standpipe 208, a gooseneck or goosenecks 210, a traveling block 211, a crown block 213 for carrying the traveling block 211 via the drill line or drill lines 212 (see, e.g., the crown block 173 of FIG. 1), a derrick 214 (see, e.g., the derrick 172 of FIG. 1), a kelly 218 or a top drive 240, a kelly drive bushing 219, a rotary table 220, a drill floor 221, a bell nipple 222, one or more blowout preventors (BOPs) 223, a drillstring 225, a drill bit 226, a casing head 227 and a flow pipe 228 that carries mud and other material to, for example, the mud tank 201.

In the example system of FIG. 2, a borehole 232 is formed in subsurface formations 230 by rotary drilling; noting that various example embodiments may also use directional drilling.

As shown in the example of FIG. 2, the drillstring 225 is suspended within the borehole 232 and has a drillstring assembly 250 that includes the drill bit 226 at its lower end. As an example, the drillstring assembly 250 may be a bottom hole assembly (BHA).

The wellsite system 200 can provide for operation of the drillstring 225 and other operations. As shown, the wellsite system 200 includes the platform 211 and the derrick 214 positioned over the borehole 232. As mentioned, the wellsite system 200 can include the rotary table 220 where the drillstring 225 pass through an opening in the rotary table 220.

As shown in the example of FIG. 2, the wellsite system 200 can include the kelly 218 and associated components, etc., or a top drive 240 and associated components. As to a kelly example, the kelly 218 may be a square or hexagonal metal/alloy bar with a hole drilled therein that serves as a mud flow path. The kelly 218 can be used to transmit rotary motion from the rotary table 220 via the kelly drive bushing 219 to the drillstring 225, while allowing the drillstring 225 to be lowered or raised during rotation. The kelly 218 can pass through the kelly drive bushing 219, which can be driven by the rotary table 220. As an example, the rotary table 220 can include a master bushing that operatively couples to the kelly drive bushing 219 such that rotation of the rotary table 220 can turn the kelly drive bushing 219 and hence the kelly 218. The kelly drive bushing 219 can include an inside profile matching an outside profile (e.g., square, hexagonal, etc.) of the kelly 218; however, with slightly larger dimensions so that the kelly 218 can freely move up and down inside the kelly drive bushing 219.

As to a top drive example, the top drive 240 can provide functions performed by a kelly and a rotary table. The top drive 240 can turn the drillstring 225. As an example, the top drive 240 can include one or more motors (e.g., electric and/or hydraulic) connected with appropriate gearing to a short section of pipe called a quill, that in turn may be screwed into a saver sub or the drillstring 225 itself. The top drive 240 can be suspended from the traveling block 211, so the rotary mechanism is free to travel up and down the derrick 214. As an example, a top drive 240 may allow for drilling to be performed with more joint stands than a kelly/rotary table approach.

In the example of FIG. 2, the mud tank 201 can hold mud, which can be one or more types of drilling fluids. As an example, a wellbore may be drilled to produce fluid, inject fluid or both (e.g., hydrocarbons, minerals, water, etc.).

In the example of FIG. 2, the drillstring 225 (e.g., including one or more downhole tools) may be composed of a series of pipes threadably connected together to form a long tube with the drill bit 226 at the lower end thereof. As the drillstring 225 is advanced into a wellbore for drilling, at some point in time prior to or coincident with drilling, the mud may be pumped by the pump 204 from the mud tank 201 (e.g., or other source) via a the lines 206, 208 and 209 to a port of the kelly 218 or, for example, to a port of the top drive 240. The mud can then flow via a passage (e.g., or passages) in the drillstring 225 and out of ports located on the drill bit 226 (see, e.g., a directional arrow). As the mud exits the drillstring 225 via ports in the drill bit 226, it can then circulate upwardly through an annular region between an outer surface(s) of the drillstring 225 and surrounding wall(s) (e.g., open borehole, casing, etc.), as indicated by directional arrows. In such a manner, the mud lubricates the drill bit 226 and carries heat energy (e.g., frictional or other energy) and formation cuttings to the surface where the mud (e.g., and cuttings) may be returned to the mud tank 201, for example, for recirculation (e.g., with processing to remove cuttings, etc.).

The mud pumped by the pump 204 into the drillstring 225 may, after exiting the drillstring 225, form a mudcake that lines the wellbore which, among other functions, may reduce friction between the drillstring 225 and surrounding wall(s) (e.g., borehole, casing, etc.). A reduction in friction may facilitate advancing or retracting the drillstring 225. During a drilling operation, the entire drill string 225 may be pulled from a wellbore and optionally replaced, for example, with a new or sharpened drill bit, a smaller diameter drill string, etc. As mentioned, the act of pulling a drill string out of a hole or replacing it in a hole is referred to as tripping. A trip may be referred to as an upward trip or an outward trip or as a downward trip or an inward trip depending on trip direction.

As an example, consider a downward trip where upon arrival of the drill bit 226 of the drill string 225 at a bottom of a wellbore, pumping of the mud commences to lubricate the drill bit 226 for purposes of drilling to enlarge the wellbore. As mentioned, the mud can be pumped by the pump 204 into a passage of the drillstring 225 and, upon filling of the passage, the mud may be used as a transmission medium to transmit energy, for example, energy that may encode information as in mud-pulse telemetry.

As an example, mud-pulse telemetry equipment may include a downhole device configured to effect changes in pressure in the mud to create an acoustic wave or waves upon which information may modulated. In such an example, information from downhole equipment (e.g., one or more modules of the drillstring 225) may be transmitted uphole to an uphole device, which may relay such information to other equipment for processing, control, etc.

As an example, telemetry equipment may operate via transmission of energy via the drillstring 225 itself. For example, consider a signal generator that imparts coded energy signals to the drillstring 225 and repeaters that may receive such energy and repeat it to further transmit the coded energy signals (e.g., information, etc.).

As an example, the drillstring 225 may be fitted with telemetry equipment 252 that includes a rotatable drive shaft, a turbine impeller mechanically coupled to the drive shaft such that the mud can cause the turbine impeller to rotate, a modulator rotor mechanically coupled to the drive shaft such that rotation of the turbine impeller causes said modulator rotor to rotate, a modulator stator mounted adjacent to or proximate to the modulator rotor such that rotation of the modulator rotor relative to the modulator stator creates pressure pulses in the mud, and a controllable brake for selectively braking rotation of the modulator rotor to modulate pressure pulses. In such example, an alternator may be coupled to the aforementioned drive shaft where the alternator includes at least one stator winding electrically coupled to a control circuit to selectively short the at least one stator winding to electromagnetically brake the alternator and thereby selectively brake rotation of the modulator rotor to modulate the pressure pulses in the mud.

In the example of FIG. 2, an uphole control and/or data acquisition system 262 may include circuitry to sense pressure pulses generated by telemetry equipment 252 and, for example, communicate sensed pressure pulses or information derived therefrom for process, control, etc.

The assembly 250 of the illustrated example includes a logging-while-drilling (LWD) module 254, a measuring-while-drilling (MWD) module 256, an optional module 258, a roto-steerable system and motor 260, and the drill bit 226. Such components or modules may be referred to as tools where a drillstring can include a plurality of tools.

The LWD module 254 may be housed in a suitable type of drill collar and can contain one or a plurality of selected types of logging tools. It will also be understood that more than one LWD and/or MWD module can be employed, for example, as represented at by the module 256 of the drillstring assembly 250. Where the position of an LWD module is mentioned, as an example, it may refer to a module at the position of the LWD module 254, the module 256, etc. An LWD module can include capabilities for measuring, processing, and storing information, as well as for communicating with the surface equipment. In the illustrated example, the LWD module 254 may include a seismic measuring device.

The MWD module 256 may be housed in a suitable type of drill collar and can contain one or more devices for measuring characteristics of the drillstring 225 and the drill bit 226. As an example, the MWD tool 254 may include equipment for generating electrical power, for example, to power various components of the drillstring 225. As an example, the MWD tool 254 may include the telemetry equipment 252, for example, where the turbine impeller can generate power by flow of the mud; it being understood that other power and/or battery systems may be employed for purposes of powering various components. As an example, the MWD module 256 may include one or more of the following types of measuring devices: a weight-on-bit measuring device, a torque measuring device, a vibration measuring device, a shock measuring device, a stick slip measuring device, a direction measuring device, and an inclination measuring device.

FIG. 2 also shows some examples of types of holes that may be drilled. For example, consider a slant hole 272, an S-shaped hole 274, a deep inclined hole 276 and a horizontal hole 278.

As an example, a drilling operation can include directional drilling where, for example, at least a portion of a well includes a curved axis. For example, consider a radius that defines curvature where an inclination with regard to the vertical may vary until reaching an angle between about 30 degrees and about 60 degrees or, for example, an angle to about 90 degrees or possibly greater than about 90 degrees.

As an example, a directional well can include several shapes where each of the shapes may aim to meet particular operational demands. As an example, a drilling process may be performed on the basis of information as and when it is relayed to a drilling engineer. As an example, inclination and/or direction may be modified based on information received during a drilling process.

As an example, deviation of a bore may be accomplished in part by use of a downhole motor and/or a turbine. As to a motor, for example, a drillstring can include a positive displacement motor (PDM).

As an example, a system may be a steerable system and include equipment to perform a method such as geosteering. As an example, a steerable system can include a PDM or a turbine on a lower part of a drillstring which, just above a drill bit, a bent sub can be mounted. As an example, above a PDM, MWD equipment that provides real time or near real time data of interest (e.g., inclination, direction, pressure, temperature, real weight on the drill bit, torque stress, etc.) and/or LWD equipment may be installed. As to the latter, LWD equipment can make it possible to send to the surface various types of data of interest, including for example, geological data (e.g., gamma ray log, resistivity, density and sonic logs, etc.).

The coupling of sensors providing information on the course of a well trajectory, in real time or near real time, with, for example, one or more logs characterizing the formations from a geological viewpoint, can allow for implementing a geosteering method. Such a method can include navigating a subsurface environment, for example, to follow a desired route to reach a desired target or targets.

As an example, a drillstring can include an azimuthal density neutron (ADN) tool for measuring density and porosity; a MWD tool for measuring inclination, azimuth and shocks; a compensated dual resistivity (CDR) tool for measuring resistivity and gamma ray related phenomena; one or more variable gauge stabilizers; one or more bend joints; and a geosteering tool, which may include a motor and optionally equipment for measuring and/or responding to one or more of inclination, resistivity and gamma ray related phenomena.

As an example, geosteering can include intentional directional control of a wellbore based on results of downhole geological logging measurements in a manner that aims to keep a directional wellbore within a desired region, zone (e.g., a pay zone), etc. As an example, geosteering may include directing a wellbore to keep the wellbore in a particular section of a reservoir, for example, to minimize gas and/or water breakthrough and, for example, to maximize economic production from a well that includes the wellbore.

Referring again to FIG. 2, the wellsite system 200 can include one or more sensors 264 that are operatively coupled to the control and/or data acquisition system 262. As an example, a sensor or sensors may be at surface locations. As an example, a sensor or sensors may be at downhole locations. As an example, a sensor or sensors may be at one or more remote locations that are not within a distance of the order of about one hundred meters from the wellsite system 200. As an example, a sensor or sensor may be at an offset wellsite where the wellsite system 200 and the offset wellsite are in a common field (e.g., oil and/or gas field).

As an example, one or more of the sensors 264 can be provided for tracking pipe, tracking movement of at least a portion of a drillstring, etc.

As an example, the system 200 can include one or more sensors 266 that can sense and/or transmit signals to a fluid conduit such as a drilling fluid conduit (e.g., a drilling mud conduit). For example, in the system 200, the one or more sensors 266 can be operatively coupled to portions of the standpipe 208 through which mud flows. As an example, a downhole tool can generate pulses that can travel through the mud and be sensed by one or more of the one or more sensors 266. In such an example, the downhole tool can include associated circuitry such as, for example, encoding circuitry that can encode signals, for example, to reduce demands as to transmission. As an example, circuitry at the surface may include decoding circuitry to decode encoded information transmitted at least in part via mud-pulse telemetry. As an example, circuitry at the surface may include encoder circuitry and/or decoder circuitry and circuitry downhole may include encoder circuitry and/or decoder circuitry. As an example, the system 200 can include a transmitter that can generate signals that can be transmitted downhole via mud (e.g., drilling fluid) as a transmission medium.

As an example, one or more portions of a drillstring may become stuck. The term stuck can refer to one or more of varying degrees of inability to move or remove a drillstring from a bore. As an example, in a stuck condition, it might be possible to rotate pipe or lower it back into a bore or, for example, in a stuck condition, there may be an inability to move the drillstring axially in the bore, though some amount of rotation may be possible. As an example, in a stuck condition, there may be an inability to move at least a portion of the drillstring axially and rotationally.

As to the term "stuck pipe", this can refer to a portion of a drillstring that cannot be rotated or moved axially. As an example, a condition referred to as "differential sticking" can be a condition whereby the drillstring cannot be moved (e.g., rotated or reciprocated) along the axis of the bore. Differential sticking may occur when high-contact forces caused by low reservoir pressures, high wellbore pressures, or both, are exerted over a sufficiently large area of the drillstring. Differential sticking can have time and financial cost.

As an example, a sticking force can be a product of the differential pressure between the wellbore and the reservoir and the area that the differential pressure is acting upon. This means that a relatively low differential pressure (delta p) applied over a large working area can be just as effective in sticking pipe as can a high differential pressure applied over a small area.

As an example, a condition referred to as "mechanical sticking" can be a condition where limiting or prevention of motion of the drillstring by a mechanism other than differential pressure sticking occurs. Mechanical sticking can be caused, for example, by one or more of junk in the hole, wellbore geometry anomalies, cement, keyseats or a buildup of cuttings in the annulus.

Figure 3:
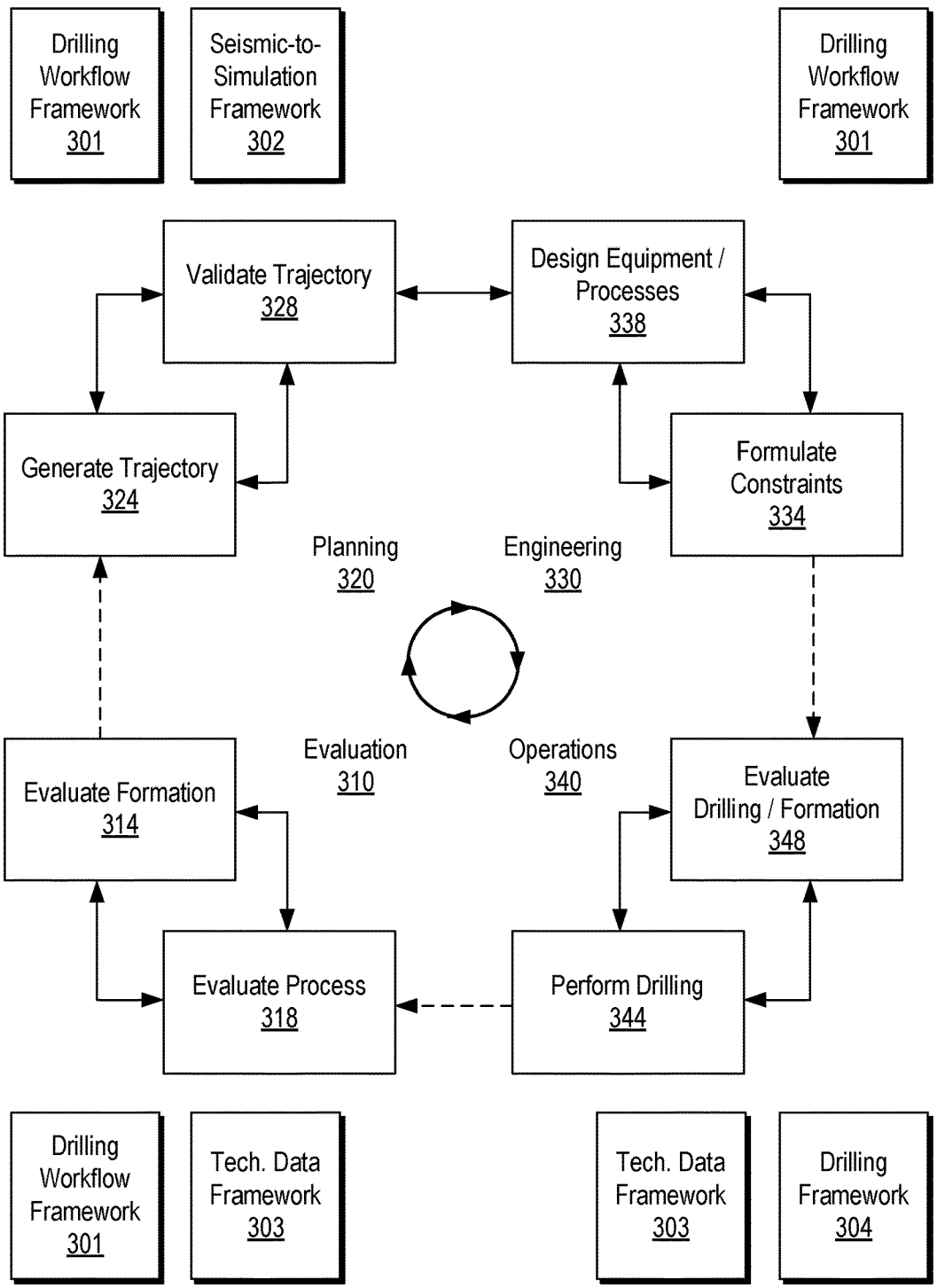
FIG. 3 illustrates an example of a system.

FIG. 3 shows an example of a system 300 that includes various equipment for evaluation 310, planning 320, engineering 330 and operations 340. For example, a drilling workflow framework 301, a seismic-to-simulation framework 302, a technical data framework 303 and a drilling framework 304 may be implemented to perform one or more processes such as a evaluating a formation 314, evaluating a process 318, generating a trajectory 324, validating a trajectory 328, formulating constraints 334, designing equipment and/or processes based at least in part on constraints 338, performing drilling 344 and evaluating drilling and/or formation 348.

In the example of FIG. 3, the seismic-to-simulation framework 302 can be, for example, the PETREL® framework (Schlumberger Limited, Houston, Texas) and the technical data framework 303 can be, for example, the TECHLOG® framework (Schlumberger Limited, Houston, Texas).

As an example, a framework can include entities that may include earth entities, geological objects or other objects such as wells, surfaces, reservoirs, etc. Entities can include virtual representations of actual physical entities that are reconstructed for purposes of one or more of evaluation, planning, engineering, operations, etc.

Entities may include entities based on data acquired via sensing, observation, etc. (e.g., seismic data and/or other information). An entity may be characterized by one or more properties (e.g., a geometrical pillar grid entity of an earth model may be characterized by a porosity property). Such properties may represent one or more measurements (e.g., acquired data), calculations, etc.

A framework may be an object-based framework. In such a framework, entities may include entities based on predefined classes, for example, to facilitate modeling, analysis, simulation, etc. A commercially available example of an object-based framework is the MICROSOFT™.NET™ framework (Redmond, Washington), which provides a set of extensible object classes. In the .NET™ framework, an object class encapsulates a module of reusable code and associated data structures. Object classes can be used to instantiate object instances for use in by a program, script, etc. For example, borehole classes may define objects for representing boreholes based on well data.

As an example, a framework can include an analysis component that may allow for interaction with a model or model-based results (e.g., simulation results, etc.). As to simulation, a framework may operatively link to or include a simulator such as the ECLIPSE® reservoir simulator (Schlumberger Limited, Houston Tex.), the INTERSECT® reservoir simulator (Schlumberger Limited, Houston Tex.), etc.

The aforementioned PETREL® framework provides components that allow for optimization of exploration and development operations. The PETREL® framework includes seismic to simulation software components that can output information for use in increasing reservoir performance, for example, by improving asset team productivity. Through use of such a framework, various professionals (e.g., geophysicists, geologists, well engineers, reservoir engineers, etc.) can develop collaborative workflows and integrate operations to streamline processes. Such a framework may be considered an application and may be considered a data-driven application (e.g., where data is input for purposes of modeling, simulating, etc.).

As an example, one or more frameworks may be interoperative and/or run upon one or another. As an example, consider the commercially available framework environment marketed as the OCEAN® framework environment (Schlumberger Limited, Houston, Texas), which allows for integration of add-ons (or plug-ins) into a PETREL® framework workflow. The OCEAN® framework environment leverages .NET™ tools (Microsoft Corporation, Redmond, Washington) and offers stable, user-friendly interfaces for efficient development. In an example embodiment, various components may be implemented as add-ons (or plug-ins) that conform to and operate according to specifications of a framework environment (e.g., according to application programming interface (API) specifications, etc.).

As an example, a framework can include a model simulation layer along with a framework services layer, a framework core layer and a modules layer. The framework may include the commercially available OCEAN® framework where the model simulation layer can include or operatively link to the commercially available PETREL® model-centric software package that hosts OCEAN® framework applications. In an example embodiment, the PETREL® software may be considered a data-driven application. The PETREL® software can include a framework for model building and visualization. Such a model may include one or more grids.

As an example, the model simulation layer may provide domain objects, act as a data source, provide for rendering and provide for various user interfaces. Rendering may provide a graphical environment in which applications can display their data while the user interfaces may provide a common look and feel for application user interface components.

As an example, domain objects can include entity objects, property objects and optionally other objects. Entity objects may be used to geometrically represent wells, surfaces, reservoirs, etc., while property objects may be used to provide property values as well as data versions and display parameters. For example, an entity object may represent a well where a property object provides log information as well as version information and display information (e.g., to display the well as part of a model).

As an example, data may be stored in one or more data sources (or data stores, generally physical data storage devices), which may be at the same or different physical sites and accessible via one or more networks. As an example, a model simulation layer may be configured to model projects. As such, a particular project may be stored where stored project information may include inputs, models, results and cases. Thus, upon completion of a modeling session, a user may store a project. At a later time, the project can be accessed and restored using the model simulation layer, which can recreate instances of the relevant domain objects.

As an example, the system 300 may be used to perform one or more workflows. A workflow may be a process that includes a number of worksteps. A workstep may operate on data, for example, to create new data, to update existing data, etc. As an example, a workflow may operate on one or more inputs and create one or more results, for example, based on one or more algorithms. As an example, a system may include a workflow editor for creation, editing, executing, etc. of a workflow. In such an example, the workflow editor may provide for selection of one or more pre-defined worksteps, one or more customized worksteps, etc. As an example, a workflow may be a workflow implementable at least in part in the PETREL® software, for example, that operates on seismic data, seismic attribute(s), etc.

As an example, seismic data can be data acquired via a seismic survey where sources and receivers are positioned in a geologic environment to emit and receive seismic energy where at least a portion of such energy can reflect off subsurface structures. As an example, a seismic data analysis framework or frameworks (e.g., consider the OMEGA® framework, marketed by Schlumberger Limited, Houston, Texas) may be utilized to determine depth, extent, properties, etc. of subsurface structures. As an example, seismic data analysis can include forward modeling and/or inversion, for example, to iteratively build a model of a subsurface region of a geologic environment. As an example, a seismic data analysis framework may be part of or operatively coupled to a seismic-to-simulation framework (e.g., the PETREL® framework, etc.).

As an example, a workflow may be a process implementable at least in part in the OCEAN® framework. As an example, a workflow may include one or more worksteps that access a module such as a plug-in (e.g., external executable code, etc.).

As an example, a framework may provide for modeling petroleum systems. For example, the commercially available modeling framework marketed as the PETROMOD® framework (Schlumberger Limited, Houston, Texas) includes features for input of various types of information (e.g., seismic, well, geological, etc.) to model evolution of a sedimentary basin. The PETROMOD® framework provides for petroleum systems modeling via input of various data such as seismic data, well data and other geological data, for example, to model evolution of a sedimentary basin. The PETROMOD® framework may predict if, and how, a reservoir has been charged with hydrocarbons, including, for example, the source and timing of hydrocarbon generation, migration routes, quantities, pore pressure and hydrocarbon type in the subsurface or at surface conditions. In combination with a framework such as the PETREL® framework, workflows may be constructed to provide basin-to-prospect scale exploration solutions. Data exchange between frameworks can facilitate construction of models, analysis of data (e.g., PETROMOD® framework data analyzed using PETREL® framework capabilities), and coupling of workflows.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG® framework. As an example, the TECHLOG® framework can be interoperable with one or more other frameworks such as, for example, the PETREL® framework.

As an example, various aspects of a workflow may be completed automatically, may be partially automated, or may be completed manually, as by a human user interfacing with a software application. As an example, a workflow may be cyclic, and may include, as an example, four stages such as, for example, an evaluation stage (see, e.g., the evaluation equipment 310), a planning stage (see, e.g., the planning equipment 320), an engineering stage (see, e.g., the engineering equipment 330) and an execution stage (see, e.g., the operations equipment 340). As an example, a workflow may commence at one or more stages, which may progress to one or more other stages (e.g., in a serial manner, in a parallel manner, in a cyclical manner, etc.).

As an example, a workflow can commence with an evaluation stage, which may include a geological service provider evaluating a formation (see, e.g., the evaluation block 314). As an example, a geological service provider may undertake the formation evaluation using a computing system executing a software package tailored to such activity; or, for example, one or more other suitable geology platforms may be employed (e.g., alternatively or additionally). As an example, the geological service provider may evaluate the formation, for example, using earth models, geophysical models, basin models, petrotechnical models, combinations thereof, and/or the like. Such models may take into consideration a variety of different inputs, including offset well data, seismic data, pilot well data, other geologic data, etc. The models and/or the input may be stored in the database maintained by the server and accessed by the geological service provider.

As an example, a workflow may progress to a geology and geophysics ("G&G") service provider, which may generate a well trajectory (see, e.g., the generation block 324), which may involve execution of one or more G&G software packages. Examples of such software packages include the PETREL® framework. As an example, a G&G service provider may determine a well trajectory or a section thereof, based on, for example, one or more model(s) provided by a formation evaluation (e.g., per the evaluation block 314), and/or other data, e.g., as accessed from one or more databases (e.g., maintained by one or more servers, etc.). As an example, a well trajectory may take into consideration various "basis of design" (BOD) constraints, such as general surface location, target (e.g., reservoir) location, and the like. As an example, a trajectory may incorporate information about tools, bottom-hole assemblies, casing sizes, etc., that may be used in drilling the well. A well trajectory determination may take into consideration a variety of other parameters, including risk tolerances, fluid weights and/or plans, bottom-hole pressures, drilling time, etc.

As an example, a workflow may progress to a first engineering service provider (e.g., one or more processing machines associated therewith), which may validate a well trajectory and, for example, relief well design (see, e.g., the validation block 328). Such a validation process may include evaluating physical properties, calculations, risk tolerances, integration with other aspects of a workflow, etc. As an example, one or more parameters for such determinations may be maintained by a server and/or by the first engineering service provider; noting that one or more model(s), well trajectory(ies), etc. may be maintained by a server and accessed by the first engineering service provider. For example, the first engineering service provider may include one or more computing systems executing one or more software packages. As an example, where the first engineering service provider rejects or otherwise suggests an adjustment to a well trajectory, the well trajectory may be adjusted or a message or other notification sent to the G&G service provider requesting such modification.

As an example, one or more engineering service providers (e.g., first, second, etc.) may provide a casing design, bottom-hole assembly (BHA) design, fluid design, and/or the like, to implement a well trajectory (see, e.g., the design block 338). In some embodiments, a second engineering service provider may perform such design using one of more software applications. Such designs may be stored in one or more databases maintained by one or more servers, which may, for example, employ STUDIO® framework tools, and may be accessed by one or more of the other service providers in a workflow.

As an example, a second engineering service provider may seek approval from a third engineering service provider for one or more designs established along with a well trajectory. In such an example, the third engineering service provider may consider various factors as to whether the well engineering plan is acceptable, such as economic variables (e.g., oil production forecasts, costs per barrel, risk, drill time, etc.), and may request authorization for expenditure, such as from the operating company's representative, well-owner's representative, or the like (see, e.g., the formulation block 334). As an example, at least some of the data upon which such determinations are based may be stored in one or more database maintained by one or more servers. As an example, a first, a second, and/or a third engineering service provider may be provided by a single team of engineers or even a single engineer, and thus may or may not be separate entities.

As an example, where economics may be unacceptable or subject to authorization being withheld, an engineering service provider may suggest changes to casing, a bottom-hole assembly, and/or fluid design, or otherwise notify and/or return control to a different engineering service provider, so that adjustments may be made to casing, a bottom-hole assembly, and/or fluid design. Where modifying one or more of such designs is impracticable within well constraints, trajectory, etc., the engineering service provider may suggest an adjustment to the well trajectory and/or a workflow may return to or otherwise notify an initial engineering service provider and/or a G&G service provider such that either or both may modify the well trajectory.

As an example, a workflow can include considering a well trajectory, including an accepted well engineering plan, and a formation evaluation. Such a workflow may then pass control to a drilling service provider, which may implement the well engineering plan, establishing safe and efficient drilling, maintaining well integrity, and reporting progress as well as operating parameters (see, e.g., the blocks 344 and 348). As an example, operating parameters, formation encountered, data collected while drilling (e.g., using logging-while-drilling or measuring-while-drilling technology), may be returned to a geological service provider for evaluation. As an example, the geological service provider may then re-evaluate the well trajectory, or one or more other aspects of the well engineering plan, and may, in some cases, and potentially within predetermined constraints, adjust the well engineering plan according to the real-life drilling parameters (e.g., based on acquired data in the field, etc.).

Whether the well is entirely drilled, or a section thereof is completed, depending on the specific embodiment, a workflow may proceed to a post review (see, e.g., the evaluation block 318). As an example, a post review may include reviewing drilling performance. As an example, a post review may further include reporting the drilling performance (e.g., to one or more relevant engineering, geological, or G&G service providers).

Various activities of a workflow may be performed consecutively and/or may be performed out of order (e.g., based partially on information from templates, nearby wells, etc. to fill in any gaps in information that is to be provided by another service provider). As an example, undertaking one activity may affect the results or basis for another activity, and thus may, either manually or automatically, call for a variation in one or more workflow activities, work products, etc. As an example, a server may allow for storing information on a central database accessible to various service providers where variations may be sought by communication with an appropriate service provider, may be made automatically, or may otherwise appear as suggestions to the relevant service provider. Such an approach may be considered to be a holistic approach to a well workflow, in comparison to a sequential, piecemeal approach.

As an example, various actions of a workflow may be repeated multiple times during drilling of a wellbore. For example, in one or more automated systems, feedback from a drilling service provider may be provided at or near real-time, and the data acquired during drilling may be fed to one or more other service providers, which may adjust its piece of the workflow accordingly. As there may be dependencies in other areas of the workflow, such adjustments may permeate through the workflow, e.g., in an automated fashion. In some embodiments, a cyclic process may additionally or instead proceed after a certain drilling goal is reached, such as the completion of a section of the wellbore, and/or after the drilling of the entire wellbore, or on a per-day, week, month, etc. basis.

Well planning can include determining a path of a well that can extend to a reservoir, for example, to economically produce fluids such as hydrocarbons therefrom. Well planning can include selecting a drilling and/or completion assembly which may be used to implement a well plan. As an example, various constraints can be imposed as part of well planning that can impact design of a well. As an example, such constraints may be imposed based at least in part on information as to known geology of a subterranean domain, presence of one or more other wells (e.g., actual and/or planned, etc.) in an area (e.g., consider collision avoidance), etc. As an example, one or more constraints may be imposed based at least in part on characteristics of one or more tools, components, etc. As an example, one or more constraints may be based at least in part on factors associated with drilling time and/or risk tolerance.

As an example, a system can allow for a reduction in waste, for example, as may be defined according to LEAN. In the context of LEAN, consider one or more of the following types of waste: transport (e.g., moving items unnecessarily, whether physical or data); inventory (e.g., components, whether physical or informational, as work in process, and finished product not being processed); motion (e.g., people or equipment moving or walking unnecessarily to perform desired processing); waiting (e.g., waiting for information, interruptions of production during shift change, etc.); overproduction (e.g., production of material, information, equipment, etc. ahead of demand); over Processing (e.g., resulting from poor tool or product design creating activity); and defects (e.g., effort involved in inspecting for and fixing defects whether in a plan, data, equipment, etc.). As an example, a system that allows for actions (e.g., methods, workflows, etc.) to be performed in a collaborative manner can help to reduce one or more types of waste.

As an example, a system can be utilized to implement a method for facilitating distributed well engineering, planning, and/or drilling system design across multiple computation devices where collaboration can occur among various different users (e.g., some being local, some being remote, some being mobile, etc.). In such a system, the various users via appropriate devices may be operatively coupled via one or more networks (e.g., local and/or wide area networks, public and/or private networks, land-based, marine-based and/or areal networks, etc.).

As an example, a system may allow well engineering, planning, and/or drilling system design to take place via a subsystems approach where a wellsite system is composed of various subsystem, which can include equipment subsystems and/or operational subsystems (e.g., control subsystems, etc.). As an example, computations may be performed using various computational platforms/devices that are operatively coupled via communication links (e.g., network links, etc.). As an example, one or more links may be operatively coupled to a common database (e.g., a server site, etc.). As an example, a particular server or servers may manage receipt of notifications from one or more devices and/or issuance of notifications to one or more devices. As an example, a system may be implemented for a project where the system can output a well plan, for example, as a digital well plan, a paper well plan, a digital and paper well plan, etc. Such a well plan can be a complete well engineering plan or design for the particular project.

Figure 4:
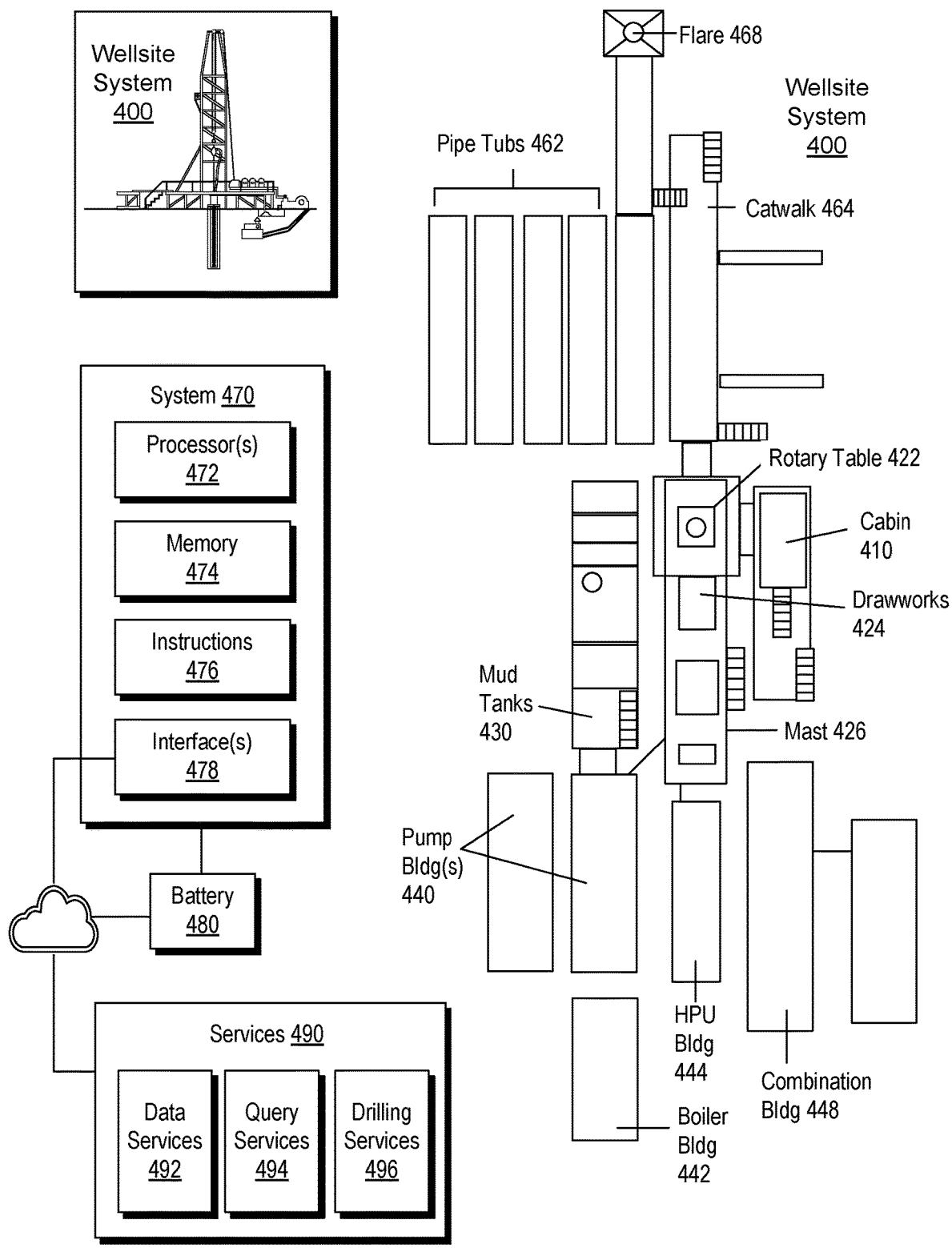
FIG. 4 illustrates an example of a wellsite system and an example of a computing system.

FIG. 4 shows an example of a wellsite system 400, specifically, FIG. 4 shows the wellsite system 400 in an approximate side view and an approximate plan view along with a block diagram of a system 470.

In the example of FIG. 4, the wellsite system 400 can include a cabin 410, a rotary table 422, drawworks 424, a mast 426 (e.g., optionally carrying a top drive, etc.), mud tanks 430 (e.g., with one or more pumps, one or more shakers, etc.), one or more pump buildings 440, a boiler building 442, an HPU building 444 (e.g., with a rig fuel tank, etc.), a combination building 448 (e.g., with one or more generators, etc.), pipe tubs 462, a catwalk 464, a flare 468, etc. Such equipment can include one or more associated functions and/or one or more associated operational risks, which may be risks as to time, resources, and/or humans.

As shown in the example of FIG. 4, the wellsite system 400 can include a system 470 that includes one or more processors 472, memory 474 operatively coupled to at least one of the one or more processors 472, instructions 476 that can be, for example, stored in the memory 474, and one or more interfaces 478. As an example, the system 470 can include one or more processor-readable media that include processor-executable instructions executable by at least one of the one or more processors 472 to cause the system 470 to control one or more aspects of the wellsite system 400. In such an example, the memory 474 can be or include the one or more processor-readable media where the processor-executable instructions can be or include instructions. As an example, a processor-readable medium can be a computer-readable storage medium that is not a signal and that is not a carrier wave.

FIG. 4 also shows a battery 480 that may be operatively coupled to the system 470, for example, to power the system 470. As an example, the battery 480 may be a back-up battery that operates when another power supply is unavailable for powering the system 470. As an example, the battery 480 may be operatively coupled to a network, which may be a cloud network. As an example, the battery 480 can include smart battery circuitry and may be operatively coupled to one or more pieces of equipment via a SMBus or other type of bus.

In the example of FIG. 4, services 490 are shown as being available, for example, via a cloud platform. Such services can include data services 492, query services 494 and drilling services 496. As an example, the services 490 may be part of a system such as the system 300 of FIG. 3.

Figure 5:
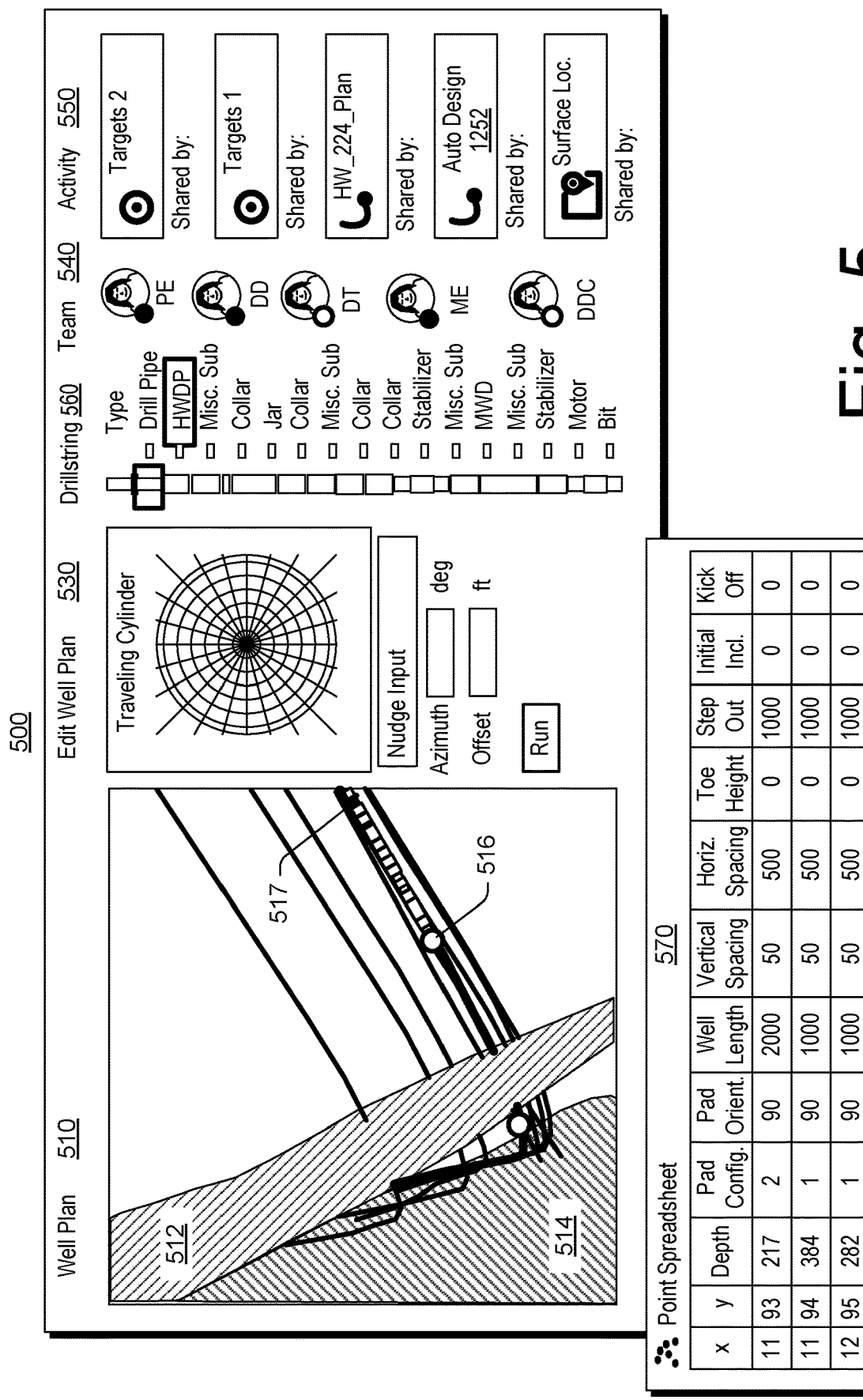
FIG. 5 illustrates an example of a graphical user interface.

FIG. 5 shows an example of a graphical user interface (GUI) 500 that includes information associated with a well plan. Specifically, the GUI 500 includes a panel 510 where surfaces representations 512 and 514 are rendered along with well trajectories where a location 516 can represent a position of a drillstring 517 along a well trajectory. The GUI 500 may include one or more editing features such as an edit well plan set of features 530. The GUI 500 may include information as to individuals of a team 540 that are involved, have been involved and/or are to be involved with one or more operations. The GUI 500 may include information as to one or more activities 550. As shown in the example of FIG. 5, the GUI 500 can include a graphical control of a drillstring 560 where, for example, various portions of the drillstring 560 may be selected to expose one or more associated parameters (e.g., type of equipment, equipment specifications, operational history, etc.). FIG. 5 also shows a table 570 as a point spreadsheet that specifies information for a plurality of wells.

In the example of FIG. 5, the drillstring graphical control 560 includes components such as drill pipe, heavy weight drill pipe (HWDP), subs, collars, jars, stabilizers, motor(s) and a bit. A drillstring can be a combination of drill pipe, a bottom hole assembly (BHA) and one or more other tools, which can include one or more tools that can help a drill bit turn and drill into material (e.g., a formation).

Figure 6:
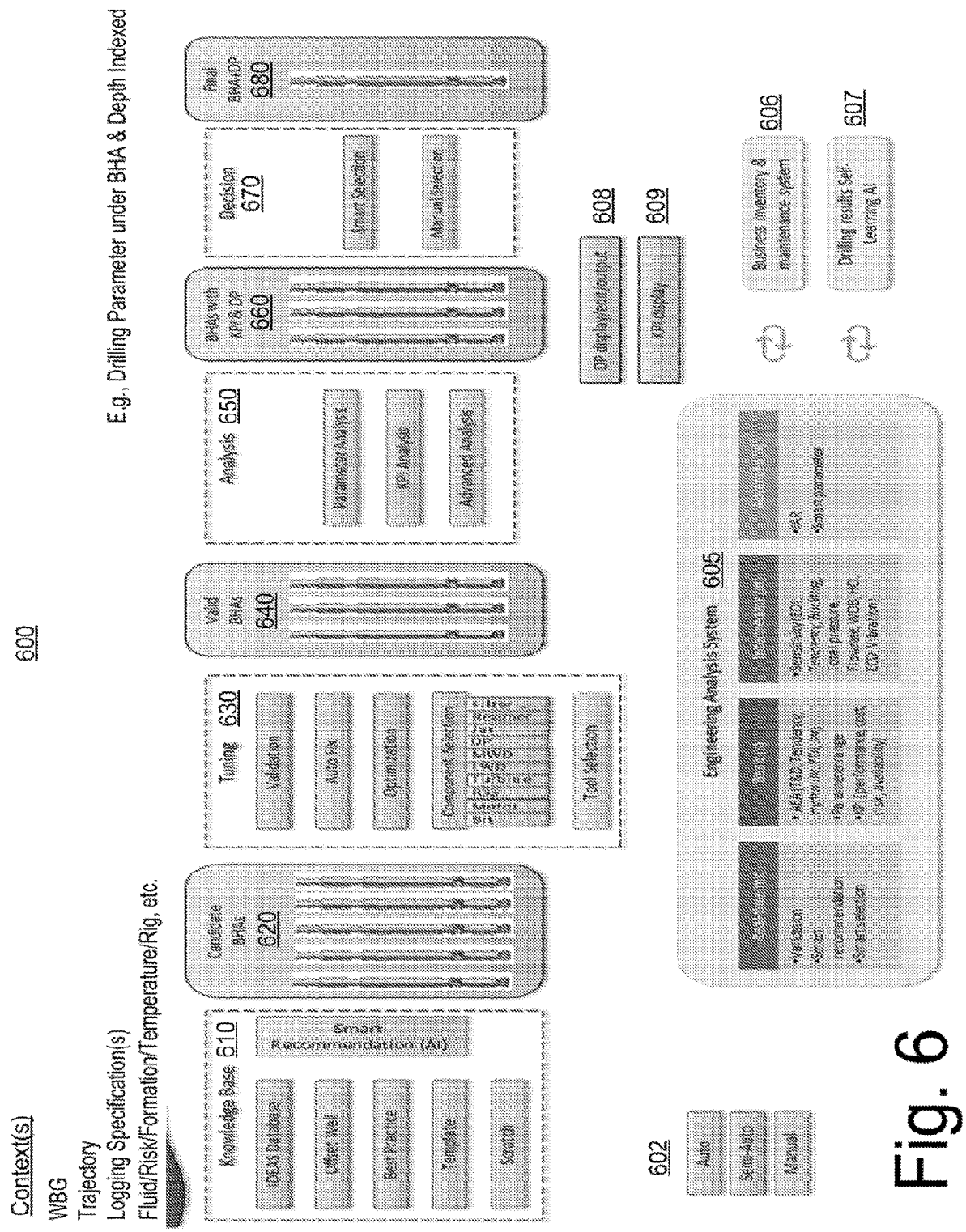
FIG. 6 illustrates an example of a framework and an example of a workflow.

FIG. 6 shows an example of a framework 600 along with a workflow associated with a drillstring assembly, which, in the example of FIG. 6, is a bottom hole assembly (BHA). As shown, the framework 600 includes various components such as a knowledge base component 610 (e.g., information, storage equipment for the information and operational equipment to manage, access, store, etc. information in the storage equipment), a tuning component 630 (e.g., one or more processor-based pieces of equipment, etc.), an analysis component 650 (e.g., one or more processor-based pieces of equipment, etc.), and a decision component 670 (e.g., one or more processor-based pieces of equipment, etc.). The framework 600 may be implemented using a single computing device such as a computer and/or may be implemented using multiple computing devices, optionally at least in part in a cloud-based architecture. The components 610, 630, 650 and 670 may be operatively coupled via circuitry such as circuitry of a circuit board or circuit boards of a computing device (e.g., printed circuits, wire circuits, busses, wireless communication circuits, etc.) and/or via one or more network interfaces, which may include wired and/or wireless network interfaces.

One or more of the components 610, 630, 650 and 670 may be operatively coupled to display circuitry and/or a display device. In such an example, instructions may be stored in memory of one or more memory devices accessible by a processor or processors that can be executed to render a graphical user interface (GUI) to one or more displays. As an example, a GUI or GUIs may be rendered to a touch-screen display, a non-touch-screen display, a projector display, etc. A GUI can present information and include one or more selectable graphical controls that can be selected and actuated via input received via one or more input devices (e.g., a touch-screen for touch input, a mouse, a touchpad, a microphone for voice input, etc.). As an example, during execution of a workflow by the framework 600, input can be received and one or more actions taken in response to the input, which may further progress the workflow, generally in a direction from left to right in the example illustrated in FIG. 6.

In the example of FIG. 6, the workflow includes output blocks 620, 640, 660 and 680. While four output blocks are illustrated in FIG. 6, a number of output blocks may differ from the example of FIG. 6 (e.g., a single output block, more than four output blocks, etc.). As an example, the framework 600 may be instructed to output information via one or more GUIs rendered to a display. As an example, a user may review information rendered to a display and then actuate one or more input mechanisms to cause the framework 600 to continue progression of the workflow. For example, a user may review output of the output block 620 and decide whether to continue the workflow (e.g., via actuating an "OK" graphical control) or, for example, a user may decide to edit output (e.g., load one or more candidate BHAs of the output block 620, delete one or more candidate BHAs of the output block 620, etc.).

In the example of FIG. 6, the framework 600 can include various features such as a mode of operation feature 602. As shown, a mode of operation can be an automated mode of operation, a semi-automated mode of operation or a manual mode of operation. As an example, the framework 600 illustrated in FIG. 6 may be represented as a GUI to a display where the mode of operation feature 602 is rendered as a graphical control or graphical controls that can be selected and actuated to cause the framework 600 to operate in a selected mode of operation.

In the example of FIG. 6, various features are color coded to the modes of the mode of operation feature 602. For example, the components 610, 630, 650 and/or 670 can include one or more automated features, one or more semi-automated features, and/or one or more manual features. In FIG. 6, the order of features of the components, where corresponding to mode(s) of operation, are presented from top to bottom akin to the mode of operation feature 602. For example, the component 610 includes various automated features in light blue (e.g., automated mode of operation), a template feature in light purple (e.g., semi-automated mode of operation) and a search feature in orange (e.g., manual mode of operation). As an example, various features may be available such that a user may intervene in operation of the framework 600 via manual interaction (e.g., input devices to make one or more selections) during performance of a workflow.

As an example, the framework 600 can include and/or be operatively coupled to one or more engineering analysis systems 605. As shown in FIG. 6, a real-time system may operate on the order of milliseconds (ms) to perform one or more tasks such as validation, smart recommendation, smart selection, etc. as to one or more drillstring assemblies; a basic system may operate on the order of seconds as to AEA (e.g., torque and drag, tendency, hydraulic, EDI, jar, etc.), parameter range, performance index(es) "KPI" (e.g., performance, cost, risk, availability, etc.); an intermediate system that may operate on the order of minutes as to sensitivity (e.g., EDI, tendency, buckling, total pressure, flowrate, weight on bit, HCl, ECD, vibration, etc.); and an advanced system that may operate on the order of hours as to IAR, one or more smart parameters, etc. As shown, various systems can operate in particular time frames. As an example, one or more systems may be selected based on particular desired output and time demands as to a workflow. For example, where time may be limited, a workflow may operate using one or more systems that operate at the order of minutes or less (e.g., less than an hour) or, for example, at the order of less than minutes (e.g., less than about 20 minutes, less than about 10 minutes, less than about 5 minutes, etc.).

In the example of FIG. 6, the framework 600 may include and/or be operatively coupled to a business inventory and maintenance system 606 and/or a drilling results self-learning artificial intelligence system 607.

As mentioned, the framework 600 can provide for output such as output to a display. For example, the framework 600 can include a drilling parameter display, edit, output, etc., component 608 and/or a parameter index(es) component 609.

The framework 600 may optionally be operated in one or more contextual modes. For example, consider one or more of a WBG context mode, a trajectory context mode, a logging specification(s) context mode, a fluid context mode, a risk context mode, a formation context mode, a temperature context mode, a rig context mode, etc.

As to the component 610, it can include an IDEAS database, offset well information, best practices information, one or more templates, one or more search facilities (e.g., SQL engine, matching/ranking search engine, etc.). As an example, the component 610 may include one or more features of the STUDIO® framework.

As to the component 630, it can include a validation feature, an automatic fix (e.g., adjust) feature, an optimization feature or features, a drillstring assembly component selection feature (e.g., as to one or more of a bit, a motor, a RSS, a turbine, a LWD component, a MWD component, a DP component, a jar, a reamer, a filter, etc.), and a tool selection feature.

As to the analysis component 650, it can include a parameter analysis feature, a performance index(es) analysis feature and an advanced analysis feature.

As to the decision component 670, it can include a smart selection feature and a manual selection feature. For example, the smart selection feature may be an automated feature of an automated mode of operation of the framework 600 that can automatically select a bottom hole assembly (BHA) as a drillstring assembly that can be output per the output block 680. As an example, the output block 680 may be operatively coupled to one or more interfaces such that the output (e.g., a BHA and drilling parameter(s)) can be transmitted to one or more destinations (e.g., IP addresses, email addresses, cellular communication addresses, etc.). In such an example, the equipment to construct the BHA as output may be known at a site or sites such that the equipment can be transported to a rig site to allow for assembly of the components of the BHA for deployment via a rig at the rig site to perform one or more operations associated with the BHA (e.g., drilling, data acquisition, etc.). As an example, one or more drilling parameters can be depth indexed. For example, where a well plan includes a trajectory that is referenced with respect to depth, whether vertical depth or trajectory depth (e.g., along a trajectory path), the framework 600 can output the one or more drilling parameters indexed with respect to depth. In such an example, the one or more drilling parameters may be implemented at a depth or depths during field operations at the rig site.

As an example, the output block 680 can be a digital output block that outputs information in digital form such as a digital format that can be utilized by one or more pieces of control equipment. For example, consider a control framework at a rig site that can receive the digital output (e.g., as a digital data stream and/or as a digital file) such that the control framework can control one or more pieces of equipment at the rig site. As an example, such a control framework can receive one or more drilling parameters associated with a selected BHA that is assembled at a rig site and call for implementation (e.g., one or more parameter adjustments) during operations at the rig site where such implementation can be depth-based implementation where the one or more drilling parameters are indexed with respect to depth. For example, information from a depth log may cause the control framework to access the one or more drilling parameters at one or more particular depths based at least in part on the information from the depth log.

As an example, a workflow implemented at least in part by the framework 600 may output a BHA specification in a manner that can improve the working efficiency and the quality of a BHA assembled and deployed via a rig at a rig site. As an example, the framework 600 may be operatively coupled to a well planning framework, which may be an automated well planning framework (see, e.g., the system 300 of FIG. 3 as to the drilling workflow framework 301). As an example, the framework 600 can implement an automated BHA design workflow and output information for assembly of a BHA at a rig site.

Figure 7:
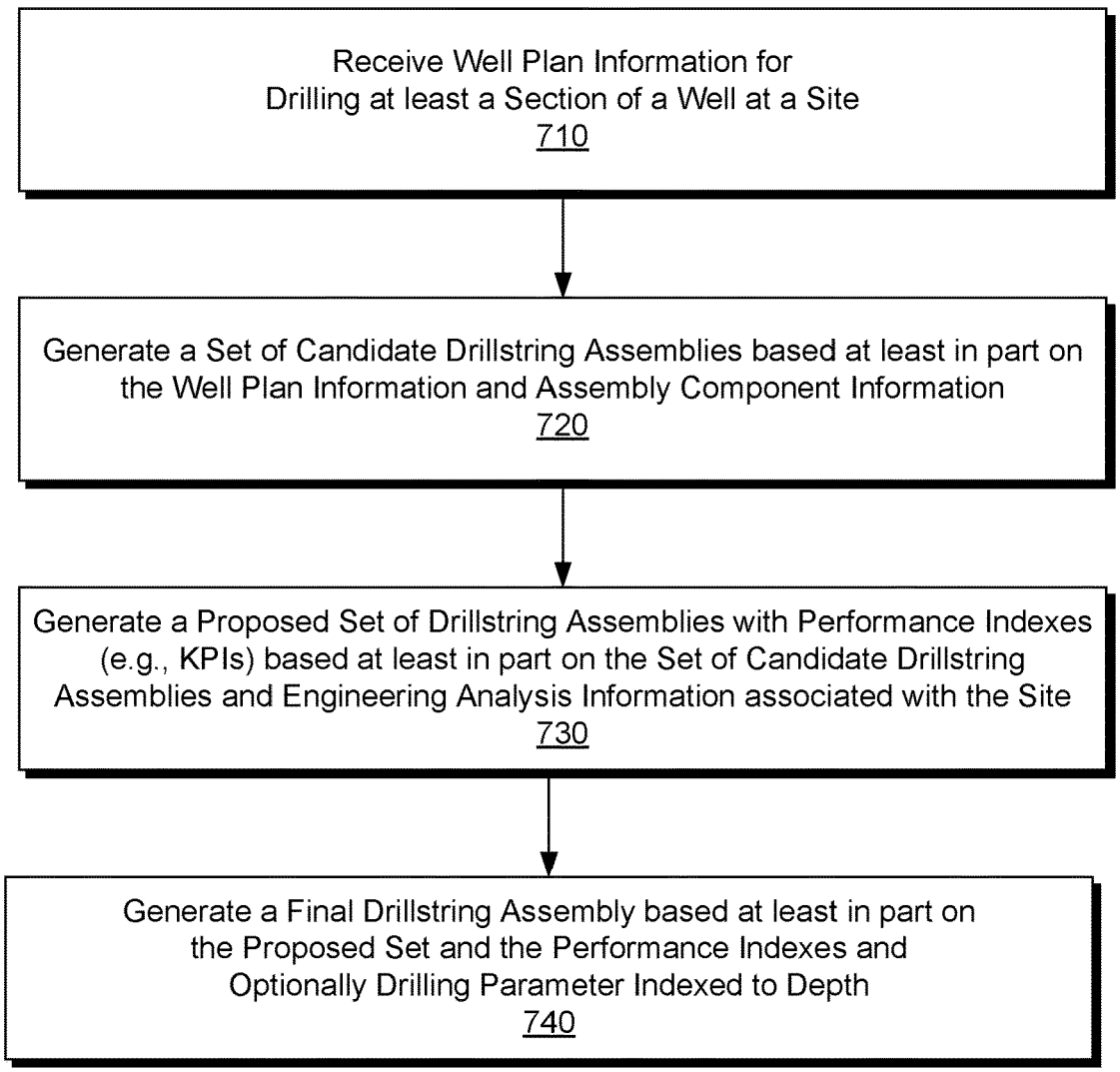
FIG. 7 illustrates an example of a method and an example of a system.
Figure 7:
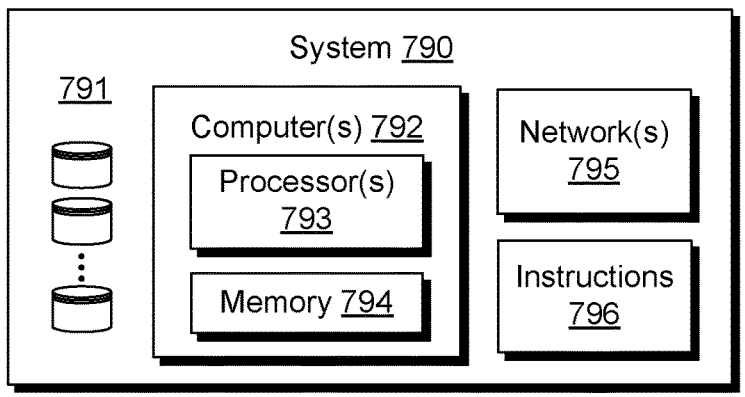

FIG. 7 shows an example of a method 700 and an example of a system 790. As shown, the method 700 includes a reception block 710 for receiving well plan information for drilling at least a section of a well at a site, a generation block 720 for generating a set of candidate drillstring assemblies based at least in part on the well plan information and assembly component information, a generation block 730 for generating a proposed set of drillstring assemblies with performance indexes (e.g., KPIs) based at least in part on the set of candidate drillstring assemblies and engineering analysis information associated with the site, and a generation block 740 for generating a final drillstring assembly based at least in part on the proposed set and the performance indexes and optionally generating drilling parameter that may be, for example, indexed with respect to depth. The method 700 may be implemented via the framework 600 of FIG. 6. In the example of FIG. 7, a BHA may be a drillstring assembly.

In the example of FIG. 7, the system 790 includes one or more information storage devices 791, one or more computers 792, one or more networks 795 and instructions 796. As to the one or more computers 792, each computer may include one or more processors (e.g., or processing cores) 793 and memory 794 for storing the instructions 796, for example, executable by at least one of the one or more processors. As an example, a computer may include one or more network interfaces (e.g., wired or wireless), one or more graphics cards, a display interface (e.g., wired or wireless), etc. As an example, the framework 600 of FIG. 6 may include one or more features of the system 790.

As an example, the framework 600, the system 790 and/or the method 700 may be operatively coupled to and/or include instructions to generate a GUI such as the GUI 500 of FIG. 5, which can include the graphical control of the drillstring 560 where, for example, various portions of the drillstring 560 may be selected to expose one or more associated parameters (e.g., type of equipment, equipment specifications, operational history, etc.). For example, the method 700 can generate a final drillstring assembly that can be rendered as the drillstring 560 of the GUI 500 where various parameters generated by the method 700 and/or associated with various components of the final drillstring assembly may be accessible via the GUI 500. As an example, output from the method 700 (e.g., the framework 600) may be received by a system that can render the GUI 500.

As an example, a method can include generating a specification for a drilling assembly such as a BHA and generating operational parameters for the drilling assembly, which may be a BHA. In such an example, the operational parameters (e.g., drilling parameters, etc.) may be indexed with respect to depth (e.g., vertical depth, distance along a trajectory, etc.). Such a method may be automated, semi-automated or driven by input received by a computing device or system.

As an example, a method can automatically build a BHA by automatically deciding tool type for a particular job (e.g., a drilling job at a rig site), automatically select the appropriate component for each tool type, and automatically building the BHA by placing different components in an assembly to form the BHA. Such a method can include automatically validating the BHA design and automatically adjusting one or more violations based on an automatic engineering analysis. As an example, such a method can include BHA comparison and optimization by KPI generation and visualization. As an example, one or more components of a drilling assembly framework may implement a Pareto Frontier algorithm for selecting an acceptable BHA (e.g., or optimal BHA) that accounts for one or more tradeoffs as to KPIs.

For a given system, the Pareto frontier or Pareto set is the set of parameterizations (allocations) that are Pareto efficient. By yielding the potentially optimal solutions, a drilling assembly framework can make focused tradeoffs within this constrained set of parameters (e.g., without consideration of full ranges of such parameters).

Pareto optimality is a formally defined concept used to determine when an allocation is optimal. An allocation is not Pareto optimal if there is an alternative allocation where improvements can be made. If there is a transfer that satisfies this condition, the reallocation is called a Pareto improvement. When no further Pareto improvements are possible, the allocation is a Pareto optimum.

As an example of a Pareto frontier, consider a plot in two dimensions as f1 versus f2 where boxed points represent feasible choices and where smaller values are more desirable to larger ones. Consider a boxed point C that is not on the Pareto frontier because it is dominated by both boxed point A and boxed point B. In such an example, boxed points A and B are not strictly dominated by other(s), and hence lie on the Pareto frontier.

Algorithms for computing the Pareto frontier of a finite set of alternatives can include the maximum vector problem (or the skyline query) and the scalarization algorithm (or the method of weighted sums).

As an example, the decision component 670 of the framework 600 may implement one or more algorithms for computing a Pareto frontier for purposes of deciding which BHA specification (e.g., and optionally associated drilling parameters) is optimal for a particular site (e.g., a site where a well is to be drilled, further drilled, etc.). In such an example, the output component 680 can output the optimal BHA specification (e.g., and optionally associated drilling parameters), which may be transmitted as digital information to one or more sites (e.g., addresses) for transport of components to the site, assembly thereof as a BHA and operation of the BHA to drill and/or to acquire data.

As an example, information acquired during assembly and/or operation of the BHA may be transmitted to the knowledge base component 610 of the framework 600, which may, for example, help to train one or more artificial intelligence features (e.g., neural networks, etc.). In such an example, the knowledge base component 610 can be a continuous learning component that learns as BHAs are assembled, operated, etc. A trained neural network may be utilized as a smart recommendation feature of the knowledge base component 610 to generate a set of candidate BHAs, as shown in the output block 620.

As mentioned, the framework 600 may implement one or more of the engineering analysis systems 605, which may operate at one or more time scales. As an example, the framework 600 may be an "online" framework that acquires real-time data and/or other job data. As to the latter, a job at a rig site may be computerized where information can be acquired and structured as a digital file and/or a digital data stream that is transmitted to one or more network interfaces of the framework 600, which may provide such information to the knowledge base component 610.

A bottom hole assembly (BHA) is a lower portion of a drillstring, that includes (from the bottom up) a bit and one or more of a steering tool (e.g., a motor, a RSS, a turbine, etc.), one or more stabilizers, a drill collar, a heavy weight drill pipe and/or one or more of various other specialized downhole tools (a MWD tool, a LWD tool, a reamer, a jar, etc.).

Specifications of a BHA aim to fulfill drilling objectives, such as drill the section of the hole successfully (e.g., deliver usable hole with acceptable drilling speed) and gather various downhole and rock properties measurements while drilling via one or more data acquisition tools (e.g., one or more sensors as part of the BHA).

As an example, a BHA may be built for a section of a well. As an example, a job may include utilizing multiple different BHAs to drill a well. Today, drilling engineers design BHAs manually, one BHA for each section of well. In a manual design process, the engineer reviews various context information such as well trajectory, wellbore geometry (e.g., open hole size, casing size, section depth interval), drilling fluid, rig, potential risk; then uses those as consideration while selecting different components from tools catalog. An engineer decides which tool type to utilize (e.g., bit, steering tool, MWD tool, LWD tool, stabilizer, jar, pipe, etc.), then selects a specific component for each tool type from a component catalog, and compiles the components (e.g., one by one) from bottom to top (surface) to create a complete draft BHA. The component catalog can include hundreds of component/tool with various vendors, sizes, and configurations, which makes selecting right component from the catalog a time-consuming task. Quality of the decision is based on an engineer's knowledge, competency, and experience level. One or more draft BHAs may be validated by running drilling engineering analysis, such as torque & drag (T&D), hydraulic, tendency, vibration, etc. In such a method, if one or more analysis criteria fail, the engineer will try to adjust the BHA by reselecting a more appropriate component or components. After multiple times of iterations, an engineer may still find some conflict on objectives such that a decision might be made subjectively as per the engineer without an understanding of the impact of different options. The manual process tends to be time-consuming; noting that often there is very little time for engineers to optimize a BHA design, which makes it difficult to guarantee design quality.

The framework 600 can provide an integrated and automated way to design a BHA with an aim to improve working efficiency and to deliver the optimum BHA for a particular well to be drilled.

As an example, the knowledge base component 610 can include information based on expert knowledge of drilling engineers and tool specialists. As an example, the framework 600 can utilize expert knowledge in decision logic of one or more of the components 610, 630, 650 and 670.

Within a well planning framework, well information such as trajectory, hole size, drilling fluid, logging demands, risk, formation, etc., can be defined, and used as a context for a BHA design. For example, the framework 600 can include receiving a digital well plan that has been generated by a well planning framework. As an example, the framework 600 can generate candidate BHAs via one or more methods. For example, a method can be an offset well analysis method. As an example, a method can be a generate from scratch method. In the offset well approach, the framework 600 can utilize context information to automatically find similar offset wells and then use the found offset wells' BHAs as candidate BHAs.

As to a generate from scratch method, the framework 600 can generate a BHA from bottom to surface by automatically selecting components from a catalog(s) and assembling them in an appropriate order.

As mentioned, the framework 600 may perform automated validation. As an example, context information can be used to automatically decide the tool type(s) in a BHA and then be used to automatically filter a catalog(s) to show the relevant or applicable tools for selection. As an example, one or more catalogs may be automatically filtered based on information from a contract system, an inventory system, and/or a rig specification.

When selecting a component of a BHA, preferences and best practices information may be available and considered as additional filter criteria for one or more component catalogs. In such an approach, the framework 600 can automatically select an appropriate component for each tool type based on a filtered catalog(s) and decision logic embedded in the framework 600 (e.g., specific bit selection based on hole size, rock type, rock hardness, steering objectives, etc.; specific steering tool selection based on trajectory dogleg requirement, well profile, hole size, etc.; specific LWD tool selection based on the logging requirement, hole size, mud type, etc.).

After automated selection, the framework 600 can generate the BHA (e.g., BHA specification) by automatically placing and assembling the components based on general practice, rule of thumb, and/or tool operational guidelines. For example, bit is the first component at the bottom, steering tool is above the bit, placement of various LWD tools and/or MWD tools can be based on the operational guideline of each tool.

As an example, candidate BHAs (e.g., from offset wells and/or built from scratch) can be validated based on automatic engineering analysis such as one or more of torque & drag, hydraulic calculation, BHA tendency, vibration analysis, fatigue analysis. Such engineering analyses may include simulation to generate simulation results. For example, a candidate BHA may be modeled in a model of a geologic environment where the candidate BHA is inserted into a bore in the geologic environment to determine whether the geometry of the bore (e.g., per a trajectory of a well plan) poses one or more issues as to the shape, size, operation, etc., of the candidate BHA. For example, the trajectory may include a bend and the candidate BHA may be suitable or not as to the bend (e.g., based on length of the BHA, bendability of the BHA, type of formation, risk of bore wall collapse, etc.).

As an example, results of one or more engineering analysis can be compared with one or more of rig equipment limits, tool specification limits and one or more other engineering limits. Where a candidate BHA fails a validation (see, e.g., the tuning component 630), the framework 600 may implement an automatic fix (e.g., automatic adjust) feature (see, e.g., the tuning component 630) that aims to adjust one or more components of the BHA (e.g., changing to a different component or change the configuration) in an effort to pass validation. Or, for example, the framework 600 may exclude one or more BHAs from proposed BHAs based on failure to validate.

As an example, one or more performance indicators or indexes (KPI) can be computed for individual proposed BHAs. KPIs can include, for example, BHA total cost, steerability performance, drilling performance such as expected rate of penetration (ROP), potential risk, etc.

As an example, an engineer can compare proposed BHAs with KPIs, and decide a KPI priority and rank the proposed BHAs. In such an example, a final BHA can be selected, either manually or automatically by the framework 600.

As mentioned, BHA candidates with KPIs may be analyzed using a Pareto Frontier approach. Various KPIs may be contradictory, for example, a BHA candidate with high performance may also be associated with high risk or high cost. In a Pareto Frontier approach, a set of BHA candidates with KPIs that are not worse than others in the same set may be formed. Such an approach can be utilized to make focused tradeoffs within this constrained set of designs.

The framework 600 can implement a workflow that speeds up a BHA design process and while guaranteeing design quality. Such a framework may be operatively coupled to a well planning framework. For example, the framework 600 can receive a digital well plan. As an example, where an optimal or suitable BHA is not generated, the framework 600 can provide output to a well planning framework, which, in turn, may adjust a well plan based at least in part on one or more BHA-related factors. In such an example, the adjusted well plan may be received by the framework 600 to generate an optimal or suitable BHA.

As explained, the framework 600 can receive input that includes various well information such as trajectory, wellbore geometry, drilling fluid, rig specification, risk, formation properties, and drilling and logging objectives. Such information may be defined, at least in part, via a well planning framework that can generate digital data that can be received by the framework 600.

As an example, the framework 600 can output an optimum BHA or BHAs for a well. As an example, multiple BHAs may correspond to multiple sections of a well to be drilled. As an example, drilling parameters can be output that can be indexed with respect to depth. As an example, a controller at a rig site may automatically issue a notification to change BHA based at least in part on depth information.

The framework 600 can generate one or more optimum BHAs more quickly than a manual iteration process as performed by an engineer and can generate one or more optimum BHAs with quality that exceeds that of the manual engineer-based processed, for example, due to automated validation and KPI comparison.

A manual method can include review well information as context of BHA design, decide tool types for the BHA, select a specific component for each tool type from a component catalog, compile each component one by one to build a draft BHA, validate the draft BHA through various engineering analysis and modeling, perform an iteration and adjust the BHA to pass the validation. In case of objective conflicts, the engineer decides as per her preference without an understanding of various consequences of different options. Such a manual approach is time-consuming and makes it challenging to evaluate how "good" a design is among the possible candidates.

The framework 600 can provide for automated design by auto select/build, auto validate/fix, and KPI based comparison. The framework 600 may implement a Pareto Frontier approach for selecting a "good" BHA with tradeoff(s) on one or more KPIs. Such an approach can provide efficiency improvement, quality check(s), and an informed decision making process.

In the example framework 600, features such as auto filter for one or more catalogs can provide an efficiency improvement and reduce risk as associated with an engineer's mistake for selecting an inappropriate BHA component as per context information.

Figure 8:
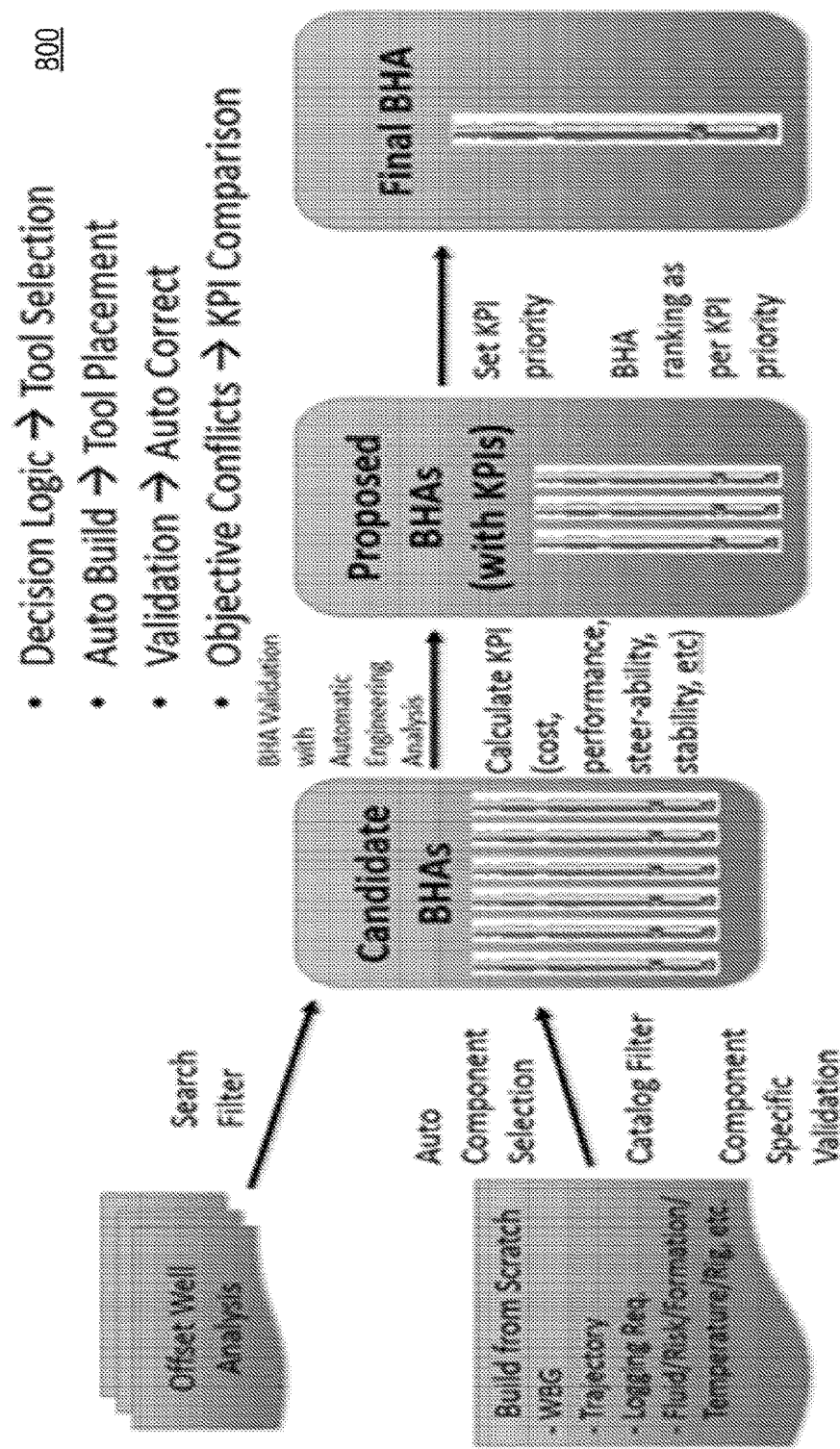
FIG. 8 illustrates an example of a method.

FIG. 8 shows an example of a method 800 that may be implemented at least in part via the framework 600 of FIG.

6. As shown in FIG. 8, the method 800 can include receiving offset well analysis information and/or build from scratch information.

As shown, the method 800 can include offset well analysis and/or catalog filter, auto component selection, auto validation/fix with automatic engineering analysis, BHA KPI generation and comparison. Auto catalog filter and auto component selection logic can be utilized to build candidate BHAs. As shown, auto validation with automatic engineering analysis can be utilized to filter proposed BHAs. As shown, KPI comparison can be utilized to decide on a final BHA.

The framework 600 may implement decision logic based at least in part on expert knowledge and also generate KPI based on one or more engineering analyses.

Figure 9:
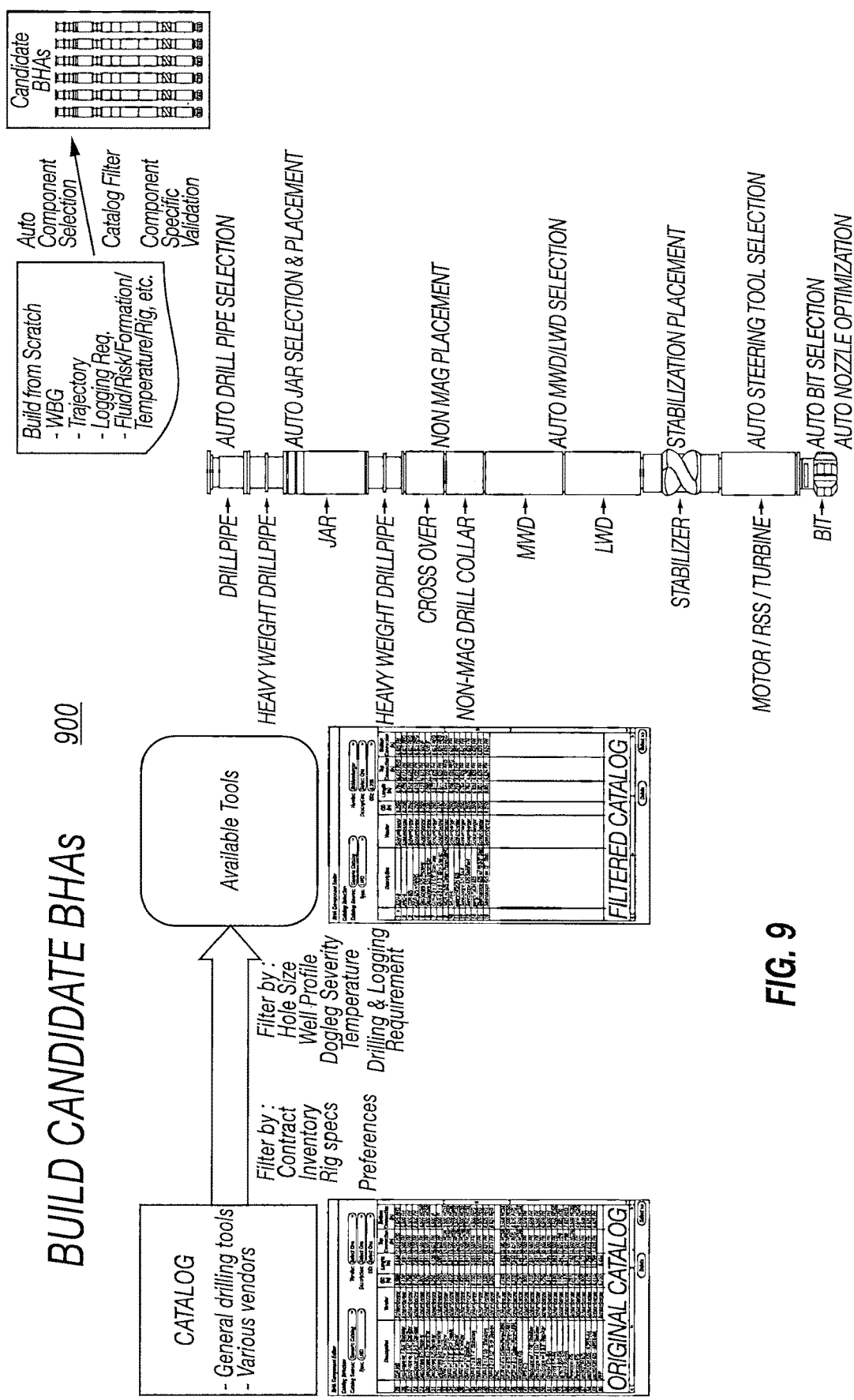
FIG. 9 illustrates an example of a method.

FIG. 9 shows an example of a method 900, which may be part of the method 800. In the examples of FIGS. 8, 9, 10 and 11, the illustrations include one or more graphical user interfaces that may be rendered to a display or displays at least in part by the framework 600 as operatively coupled to an interface (e.g., network interface, bus, etc.).

In the example of FIG. 9, a catalog includes information that can be filtered based on one or more criteria to generate a filtered catalog. The filtered catalog can be utilized to generate candidate BHAs where, for example, selection of one or more BHA components may be performed in an automated manner based at least in part on the filtered catalog.

Figure 10:
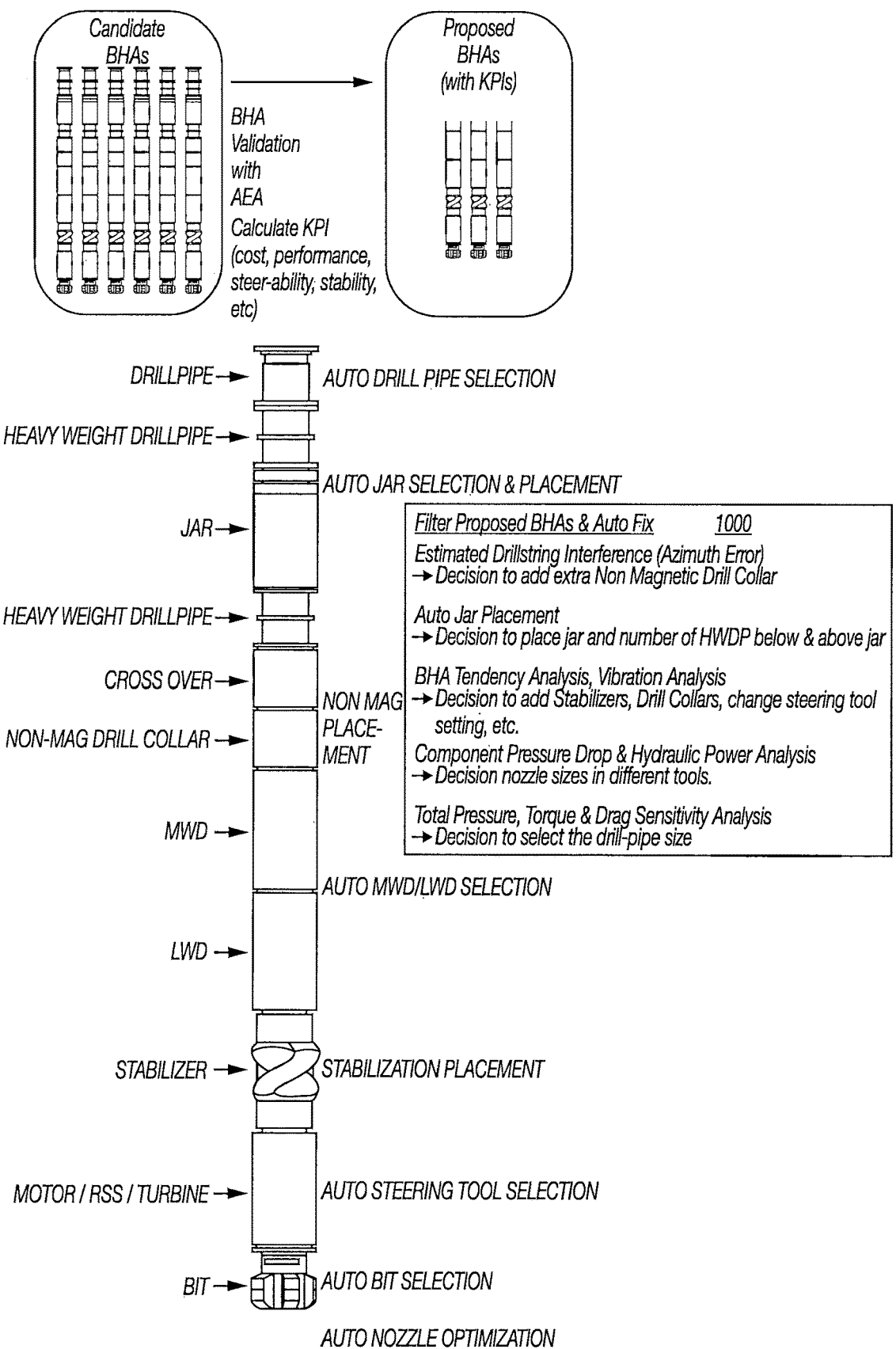
FIG. 10 illustrates an example of a method.

FIG. 10 shows an example of a method 1000 that may be part of the method 800 of FIG. 8. As shown, candidate BHAs may be input and proposed BHAs with KPIs generated. In such an example, the method 1000 can include filtering proposed BHAs and implementing one or more automated fix (e.g., adjust) algorithms. Various examples are illustrated in FIG. 10, including an interference approach (e.g., azimuth error based), an auto jar placement approach, a BHA tendency analysis and/or vibration analysis approach, a component pressure drop and/or hydraulic power analysis approach, and a total pressure, torque and drag sensitivity analysis approach. As shown, the various approaches can be utilized as to selection (e.g., optionally auto fix) of one or more components of a BHA.

Figure 11:
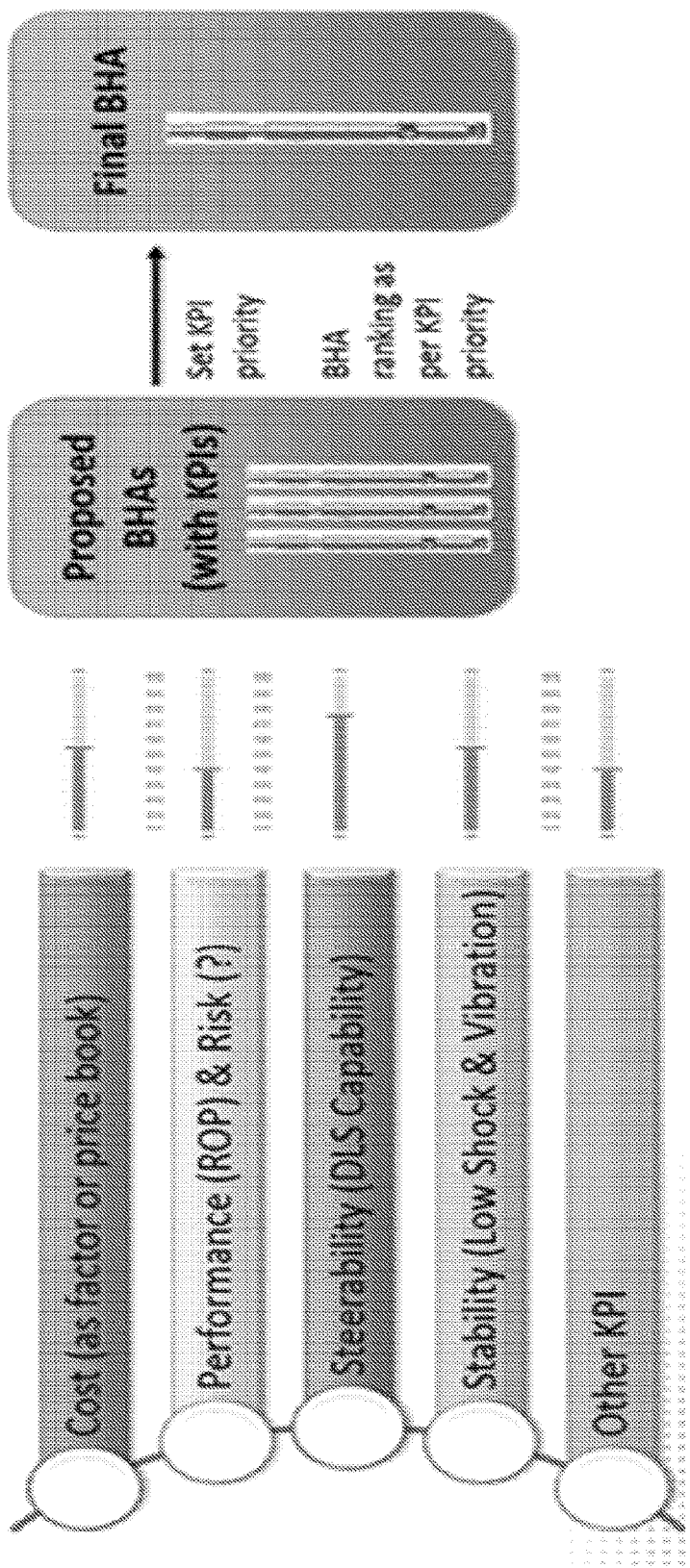
FIG. 11 illustrates an example of a method.

FIG. 11 shows an example of a method 1100 that may be part of the method 800 of FIG. 8. As shown, proposed BHAs with KPIs are input and a final BHA is output, optionally with drilling parameters, which may be, for example, depth indexed.

In the example of FIG. 11, the method 1100 can include rendering a graphical user interface (GUI) to a display that includes information as to one or more of cost, performance (e.g., ROP, risk, etc.), steerability (e.g., DLS capability), stability (e.g., low shock and vibration) and/or one or more other KPIs. In such an example, graphical controls may be rendered that can be selected and adjusted to, for example, provide weights (e.g., or ranking) to one or more of the KPIs. Such information may optionally be utilized in selection of a final BHA, which may be an optimum BHA. As mentioned, a Pareto Frontier algorithm may be implemented for selection of a BHA based on a set of BHAs. In such an example, the KPI graphical controls may be utilized for input as to information to the Pareto Frontier algorithm. In such an example, an adjustment to a KPI via a graphical control may result in a particular BHA being selected as optimal and a readjustment may result in a different particular BHA being selected. In such an example, a user may interact with the framework 600 as part of a selection process where a user may intend to have a selected BHA meet one or more KPIs (e.g., one or more KPIs may be more desired than one or more other KPIs). In such an example, a Pareto Frontier algorithm may be executed and re-executed in an interactive manner based at least in part on input received via one or more graphical controls rendered to a display.

As an example, information learned from an offset well analysis can be use as part of a BHA validation process and/or a KPI process. As an example, once one or more candidate BHAs are generated, proposed BHAs generated, and/or a final BHA selected, a method (or methods) may perform one or more checks with an offset well database to find one or more similar BHAs to get information as to performance of such BHA(s) and feedback, for example, as to KPI for consideration.

As mentioned, a framework can include components that can be utilized to implement a workflow that can auto design a BHA. Such a workflow can include automatically building a BHA from scratch by automatically deciding tool type, automatically selecting the appropriate component for each tool type, and automatically building the BHA by placing different component in appropriate order. Such a workflow can include automatically validating the BHA design and automatically fixing one or more violations (as appropriate) based at least in part on one or more automatic engineering analysis. Such a workflow can further include a BHA comparison and optimization by KPI generation and visualization. As mentioned, a Pareto Frontier algorithm may be implemented for selecting an acceptable BHA with tradeoffs on one or more KPIs.

Figure 12:
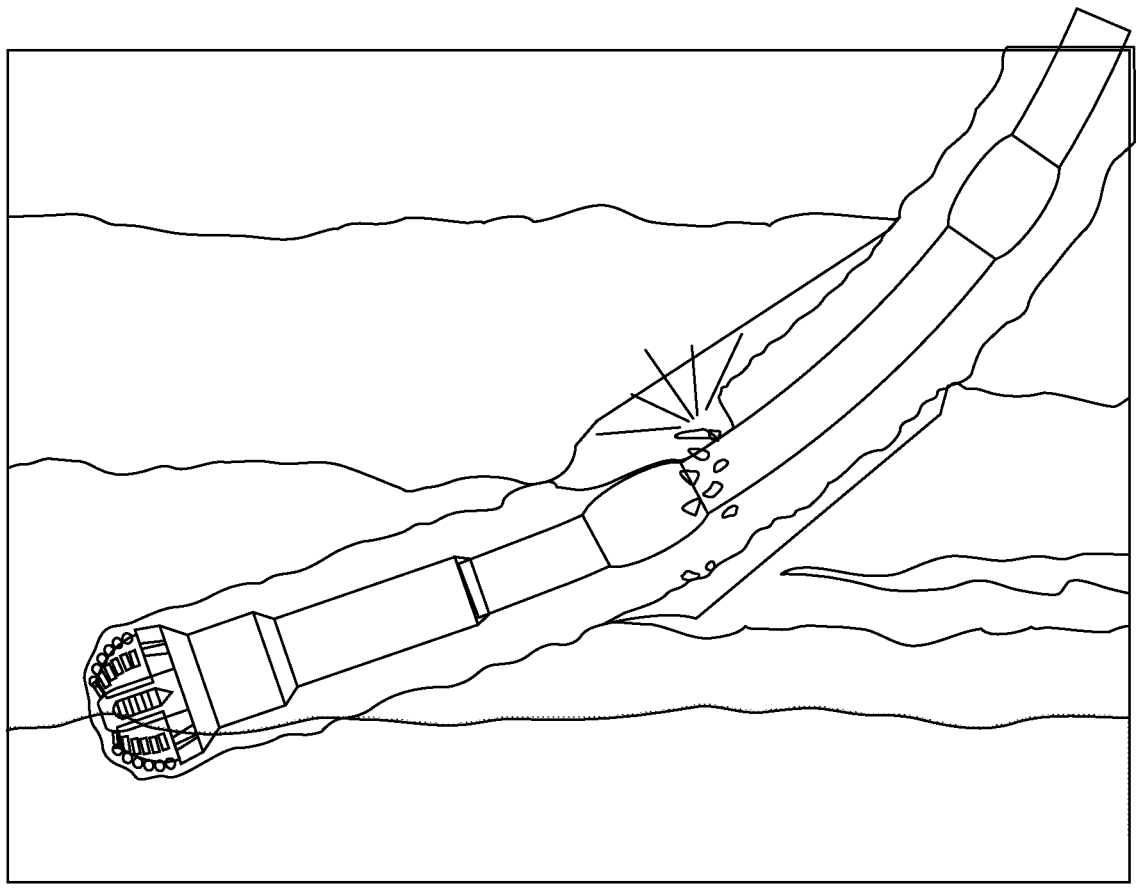
FIG. 12 illustrates an example of an engineering analysis result.

FIG. 12 shows an example of an engineering analysis 1200 as to geometry of a bore in a geologic environment and a drillstring assembly. Such an analysis may be utilized a physics-based model as to bore stability (e.g., bore wall stability) and/or physics of a drillstring assembly such as a BHA (e.g., bendability, force to bend, contact with rock, etc.). As an example, the engineering analysis 1200 can detect a violation as to a BHA and a well plan. In such an example, the violation may be a geometric violation or another type of violation. As an example, results from one or more engineering analyses may be utilized as feedback to the framework 600 of FIG. 6 and/or to a well planning framework.

As an example, loose or unconsolidated formation sands or gravels can collapse into a borehole and pack-off a drillstring as supporting rock is removed by a bit. Schists, laminated shales, fractures and faults can create loose rock that caves into the hole and jam a drillstring.

In regions where tectonic stresses are high, rock is being deformed by movement of the Earth's crust. In such areas, the rock around the wellbore may collapse into the well. In some cases, hydrostatic pressure to stabilize a hole may be much higher than the fracture initiation pressure of exposed formations.

Mobile formations (e.g., salt or shale) can behave in a plastic manner. When compressed by overburden, they may flow and squeeze into a wellbore, thereby constricting or deforming the hole and trapping the tubulars.

Overpressured shales can be characterized by formation pore pressures that exceed normal hydrostatic pressure. Insufficient mud weight in these formations may permit a hole to become unstable and collapse around pipe.

Reactive shales and clays tend to absorb water from drilling fluid. Over time—ranging from hours to days—they can swell into the wellbore.

Drillstring vibration may cause caving of a bore. Such cavings can pack around a pipe, causing it to stick. Downhole vibration may be controlled by monitoring parameters such as weight on bit, rate of penetration and rotary speed, which can be adjusted from a driller's console.

Differential sticking may happens when the drillstring is held against a bore by hydrostatic overbalance between the bore pressure and the pore pressure of a permeable formation. Such an issue may occur when a stationary or slow-moving drillstring contacts a permeable formation, and where a thick filtercake is present. As an example, a depleted reservoir may be a cause of differential sticking.

Keyseating takes place when rotation of a drillpipe wears a groove into the borehole wall. When the drillstring is tripped, the bottomhole assembly (BHA) or larger-diameter tool joints can be pulled into the keyseat and become jammed. A keyseat may also form at the casing shoe if a groove is worn in the casing or the casing shoe splits. Such an issue can occur at abrupt changes in inclination or azimuth, for example, while pulling out of the hole and after sustained periods of drilling between wiper trips. Wireline logging tools and cables may be susceptible to keyseating.

As an example, an undergauge hole may develop while drilling hard, abrasive rock. As the rock wears away the bit and stabilizer, the bit drills an undergauge, or smaller than specified, hole. When a subsequent in-gauge bit is run, it can encounter resistance in the undergauge section of hole. If the string is run into the hole too quickly or without reaming, the bit can jam in the undergauge section. Such an issue may occur when running a new bit, after coring, while drilling abrasive formations, when a PDC bit is run after a roller cone bit, etc.

Cement blocks may pack-off the drillstring, for example, when hard cement around the casing shoe breaks off and falls into the new openhole interval drilled out from under casing. Uncured, or green, cement may trap a drillstring after a casing job. For example, when the top of cement is encountered while tripping in the hole, a higher than expected pressure surge may be generated by the BHA, causing the cement to set instantaneously around the BHA.

Collapsed casing can occur when pressures exceed a casing collapse pressure rating or when casing wear or corrosion weakens the casing. The casing may also buckle as a result of aggressive running practices. Such conditions may be discovered when the BHA is run in the hole and hangs up inside the casing. As an example, an engineering analysis may simulate such phenomena and utilize the simulation results as part of a workflow implemented by a framework such as the framework 600 of FIG. 6.

Hole cleaning problems prevent solids from being transported out of the wellbore. When cuttings settle at the low side of deviated wellbores, they may form layered beds that may pack around the BHA. Cuttings and cavings may also slide down the annulus when pumps are turned off, thus packing around the drillstring. Such issues may occur due to one or more of low annular flow rates, inadequate mud properties, insufficient mechanical agitation and short circulation time.

As an example, an engineering analysis system can be a drilling event analysis system, which can include an analysis engine, which may include a Bayesian network. As an example, consider the APACHE STORM engine (Apache Software Foundation, Forest Hill, Maryland).

As an example, a method can include identifying one or more types of events by implementing a topology that includes a directed acyclic graph. For example, the APACHE STORM application can include utilization of a topology that includes a directed acyclic graph (DAG). A DAG can be a finite directed graph with no directed cycles that includes many vertices and edges, with each edge directed from one vertex to another, such that there is no way to start at any vertex v and follow a consistently-directed sequence of edges that eventually loops back to v again. As an example, a DAG can be a directed graph that includes a topological ordering, a sequence of vertices such that individual edges are directed from earlier to later in the sequence. As an example, a DAG may be used to model different kinds of information.

Risk probability may be described as a measure of the likelihood that the consequences described in a risk statement will occur and may be expressed, for example, as a numerical value. For example, risk probability can be greater than zero where a risk poses a threat and, for example, risk probability can be less than 100 percent where it is other than a certain problem (e.g., a known problem).

Probabilistic risk assessment or PRA involves evaluation of risks associated with the use of various types of technology, which can include associated implementation of various techniques. As an example, risk may be characterized by two quantities: Magnitude of Severity (e.g., intensity or seriousness of the situation) and Probability of Occurrence (e.g., chance a high risk event could occur, which may be in part based on historical occurrences of similar events). Whether or not it is feasible to invest in the risk of concern may be determined based on the probability of the event and its severity. For example, risk being equal to a product of frequency and consequence.

As an example, a physics-based model approach can enhance PRA through use of information such as real-time data that can be input to one or more physics-based models. Such an approach can help to address low frequency and high consequence events. As an example, a framework may assess information and/or results with respect to underlying uncertainty, which may be characterized as to quantifiability, and linked with estimation of probability.

As shown in FIG. 6, the engineering analysis system 605 can provide for analysis of one or more BHAs, which can be part of a validation and/or an adjustment process or, for example, part of a parameter analysis process and/or a KPI analysis process.

A method can include receiving well plan information for drilling at least a section of a well at a site; generating a set of candidate drillstring assemblies based at least in part on at least a portion of the well plan information and drillstring assembly component information; generating a proposed set of drillstring assemblies with performance indexes based at least in part on the set of candidate drillstring assemblies and engineering analysis information associated with the site; and generating a final drillstring assembly based at least in part on the proposed set of drillstring assemblies and the performance indexes. In such an example, the final drillstring assembly can be or include a bottom hole assembly where, for example, the bottom hole assembly includes a drill bit.

As an example, a method can include generating the final drillstring assembly by selecting the final drillstring assembly from the proposed set of drillstring assemblies.

A method can include generating a proposed set of drillstring assembly by at least in part adjusting at least one of the set of candidate drillstring assemblies based at least in part on a violation detected by at least one engineering analysis that generates at least a portion of the engineering analysis information associated with the site.

As an example, a method can include generating a final drillstring assembly by a Pareto Frontier algorithm.

As an example, a method can include accessing information associated with one or more offset wells in a field that includes a site for which a drillstring assembly is being generated. In such an example, the method can include generating the set of candidate drillstring assemblies based at least in part on the information associated with one or more of the offset wells.

As an example, a method can include generating at least one drilling parameter indexed with respect to depth (e.g., depth in a well, along a trajectory, etc.). In such an example, the method can include outputting the at least one drilling parameter indexed with respect to depth as a digital file.

As an example, a method can include outputting a final drillstring assembly as a digital file that specifies at least an order of components of the final drillstring assembly. In such an example, the method can include generating at least one drilling parameter indexed with respect to depth and outputting the at least one drilling parameter indexed with respect to depth as part of the digital file.

As an example, a method can include rendering a graphical user interface to a display where the graphical user interface includes graphical controls for at least two of performance indexes. In such an example, the method can include receiving input associated with one or more of the graphical controls and generating a final drillstring assembly based at least in part on the input.

A system can include a processor; memory accessible by the processor; processor-executable instructions stored in the memory and executable to instruct the system to: receive well plan information for drilling at least a section of a well at a site; generate a set of candidate drillstring assemblies based at least in part on at least a portion of the well plan information and drillstring assembly component information; generate a proposed set of drillstring assemblies with performance indexes based at least in part on the set of candidate drillstring assemblies and engineering analysis information associated with the site; and generate a final drillstring assembly based at least in part on the proposed set of drillstring assemblies and the performance indexes.

One or more computer-readable storage media can include processor-executable instructions to instruct a computing system to: receive well plan information for drilling at least a section of a well at a site; generate a set of candidate drillstring assemblies based at least in part on at least a portion of the well plan information and drillstring assembly component information; generate a proposed set of drillstring assemblies with performance indexes based at least in part on the set of candidate drillstring assemblies and engineering analysis information associated with the site; and generate a final drillstring assembly based at least in part on the proposed set of drillstring assemblies and the performance indexes.

A system can include a knowledge base component operatively coupled to at least one data storage device where the knowledge base component accesses at least a portion of data in the at least one data storage device and generates candidate bottom hole assemblies for drilling at least a section of a well at a site; a tuning component operatively coupled to at least one processor where the tuning component generates a refined set of bottom hole assemblies as a subset of the candidate bottom hole assemblies based at least in part on simulation results that simulate bottom hole assembly physics in at least a portion of the well at the site; an analysis component operatively coupled to at least one processor where the analysis component generates a set of performance indexes and drilling parameters associated with at least a portion of the refined set of bottom hole assemblies; and a decision component operatively coupled to at least one processor where the decision component selects one of the refined set of bottom hole assemblies as an optimal bottom hole assembly for drilling the section of the well at the site. In such an example, the decision component can execute a Pareto Frontier algorithm to select the one of the refined set of bottom hole assemblies. As an example, the aforementioned system can include a graphical user interface component that renders a graphical user interface to a display where the graphical user interface includes at least one performance index graphical control that receives input for adjusting a weight of the at least one performance index and where the decision component selects the one of the refined set of bottom hole assemblies as the optimum bottom hole assembly based at least in part on the input.

As an example, a system can include an interface operatively coupled to a well planning framework where a knowledge base component of the system receives well plan for a section of a well at a site via the interface and generates candidate bottom hole assemblies for drilling at least the section of the well at the site based at least in part on the well plan information.

As an example, a method may be implemented in part using computer-readable media (CRM), for example, as a module, a block, etc. that include information such as instructions suitable for execution by one or more processors (or processor cores) to instruct a computing device or system to perform one or more actions. As an example, a single medium may be configured with instructions to allow for, at least in part, performance of various actions of a method. As an example, a computer-readable medium (CRM) may be a computer-readable storage medium (e.g., a non-transitory medium) that is not a carrier wave.

According to an embodiment, one or more computer-readable media may include computer-executable instructions to instruct a computing system to output information for controlling a process. For example, such instructions may provide for output to sensing process, an injection process, drilling process, an extraction process, an extrusion process, a pumping process, a heating process, etc.

Figure 13:
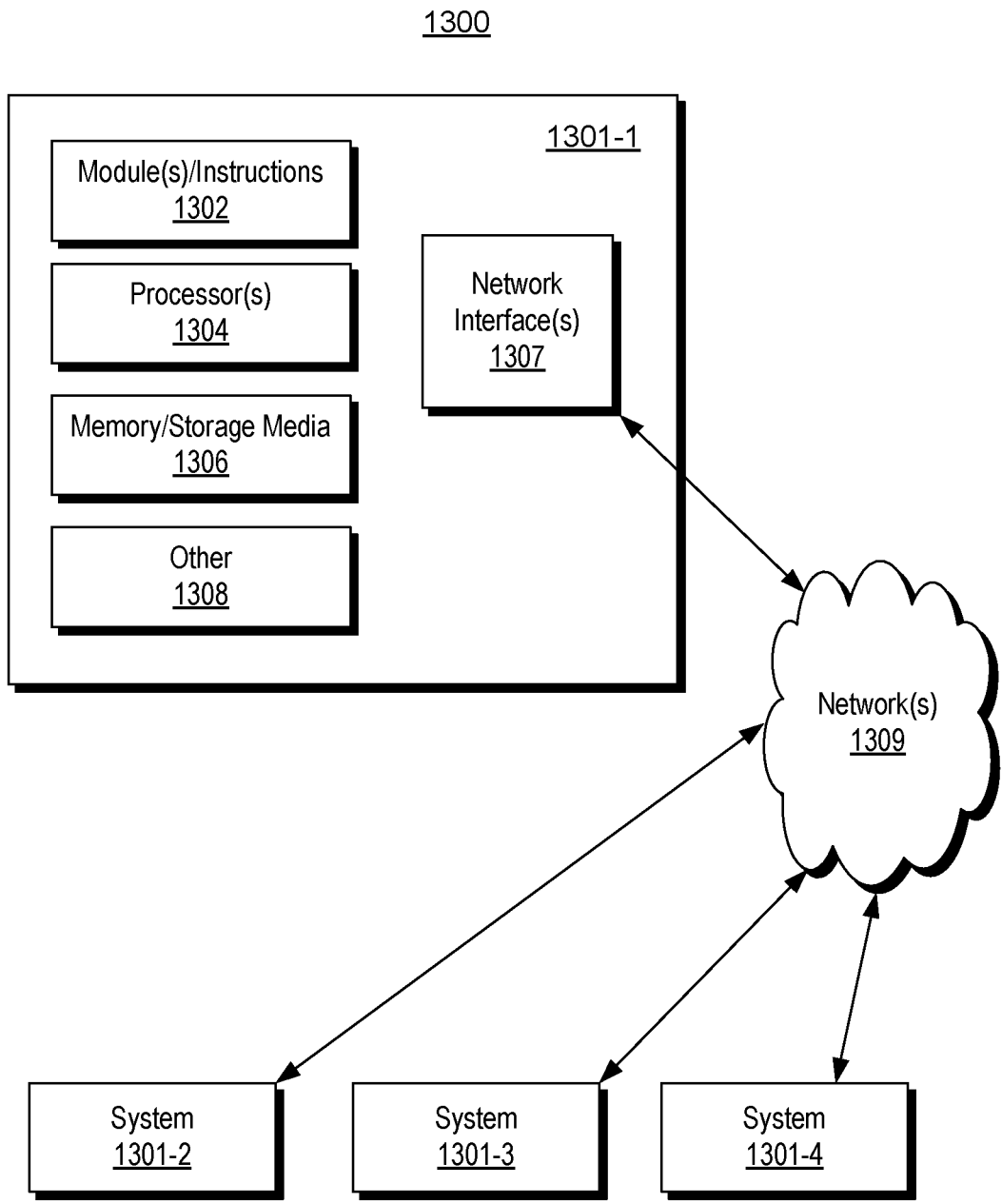
FIG. 13 illustrates an example of computing system.

In some embodiments, a method or methods may be executed by a computing system. FIG. 13 shows an example of a system 1300 that can include one or more computing systems 1301-1, 1301-2, 1301-3 and 1301-4, which may be operatively coupled via one or more networks 1309, which may include wired and/or wireless networks.

As an example, a system can include an individual computer system or an arrangement of distributed computer systems. In the example of FIG. 13, the computer system 1301-1 can include one or more modules 1302, which may be or include processor-executable instructions, for example, executable to perform various tasks (e.g., receiving information, requesting information, processing information, simulation, outputting information, etc.).

As an example, a module may be executed independently, or in coordination with, one or more processors 1304, which is (or are) operatively coupled to one or more storage media 1306 (e.g., via wire, wirelessly, etc.). As an example, one or more of the one or more processors 1304 can be operatively coupled to at least one of one or more network interface 1307. In such an example, the computer system 1301-1 can transmit and/or receive information, for example, via the one or more networks 1309 (e.g., consider one or more of the Internet, a private network, a cellular network, a satellite network, etc.).

As an example, the computer system 1301-1 may receive from and/or transmit information to one or more other devices, which may be or include, for example, one or more of the computer systems 1301-2, etc. A device may be located in a physical location that differs from that of the computer system 1301-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1306 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY® disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include one or more processors and/or application specific chips (e.g., or chipsets), such as ASICs, FPGAs, PLDs, or other appropriate devices.

Figure 14:
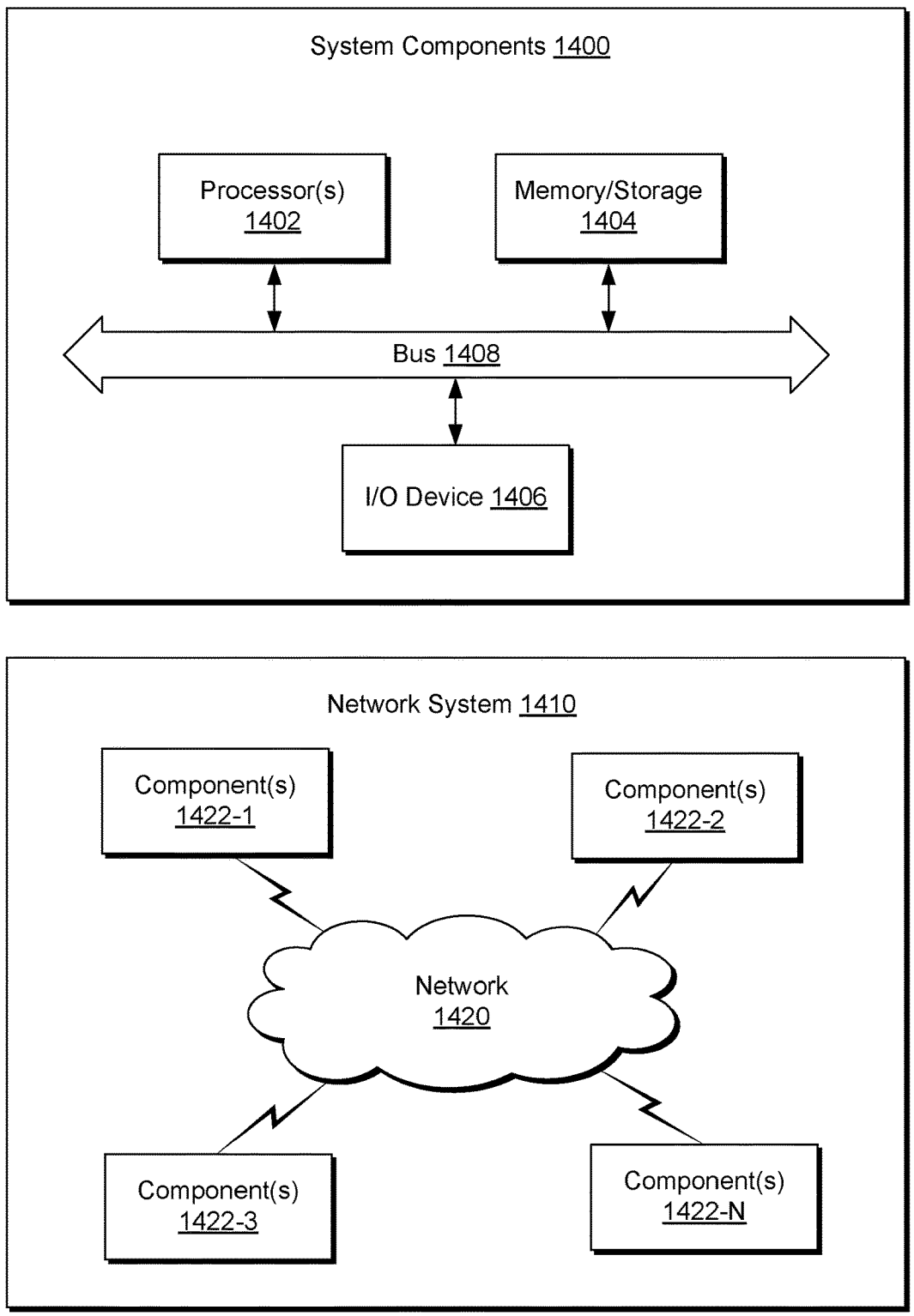
FIG. 14 illustrates example components of a system and a networked system.

FIG. 14 shows components of a computing system 1400 and a networked system 1410. The system 1400 includes one or more processors 1402, memory and/or storage components 1404, one or more input and/or output devices 1406 and a bus 1408. According to an embodiment, instructions may be stored in one or more computer-readable media (e.g., memory/storage components 1404). Such instructions may be read by one or more processors (e.g., the processor(s) 1402) via a communication bus (e.g., the bus 1408), which may be wired or wireless. The one or more processors may execute such instructions to implement (wholly or in part) one or more attributes (e.g., as part of a method). A user may view output from and interact with a process via an I/O device (e.g., the device 1406). According to an embodiment, a computer-readable medium may be a storage component such as a physical memory storage device, for example, a chip, a chip on a package, a memory card, etc.

According to an embodiment, components may be distributed, such as in the network system 1410. The network system 1410 includes components 1422-1, 1422-2, 1422-3, . . . 1422-N. For example, the components 1422-1 may include the processor(s) 1402 while the component(s) 1422-3 may include memory accessible by the processor(s) 1402. Further, the component(s) 1422-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH®, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method, comprising:

receiving first well plan information for drilling at least a first section of a well at a site;

generating a first set of candidate drillstring assemblies using a knowledge base component that receives digital information from drilling jobs for offset wells at other sites for training a neural network to generate a trained neural network, the trained neural network generating the first set of candidate drillstring assemblies based at least on at least a portion of the first well plan information and drillstring assembly component information;

automatically performing simulations for the first set of candidate drillstring assemblies to generate engineering analysis information associated with the site;

automatically generating a first proposed, validated set of drillstring assemblies and first performance indexes for each member of the first proposed, validated set of drillstring assemblies, the first proposed, validated set of drillstring assemblies and the first performance indexes being based at least on the first set of candidate drillstring assemblies and based at least on the engineering analysis information associated with the site, the automatically generating the first proposed, validated set of drillstring assembly comprising automatically adjusting at least one of the first set of candidate drillstring assemblies based on a violation detected by at least one engineering analysis that generates at least a portion of the engineering analysis information associated with the site;

generating a first final drillstring assembly based at least on the first proposed, validated set of drillstring assemblies and the first performance indexes, the generating the first final drillstring assembly comprising implementing an algorithm for making performance index tradeoffs, within the first proposed, validated set of drillstring assemblies, between at least two or more of a rate of penetration and risk performance index, a steerability performance index, or a stability performance index;

generating at least one operational parameter for operating the first final drillstring assembly, the at least one operational parameter being indexed with respect to depth of operation of the first final drillstring assembly;

receiving performance information from operation of the first final drillstring assembly in the first section of the well at the site;

re-training the trained neural network with the received performance information;

receiving second well plan information for drilling at least a second section of the well at the site;

generating a second set of candidate drillstring assemblies using the knowledge base component, the trained neural network generating the second set of candidate drillstring assemblies based at least on at least a portion of the second well plan information and the drillstring assembly component information;

automatically performing simulations for the second set of candidate drillstring assemblies to generate engineering analysis information associated with the site;

automatically generating a second proposed, validated set of drillstring assemblies and second performance indexes for each member of the second proposed, validated set of drillstring assemblies, the second proposed, validated set of drillstring assemblies and the second performance indexes being based at least on the second set of candidate drillstring assemblies and based at least on the engineering analysis information associated with the site, the automatically generating the second proposed, validated set of drillstring assembly comprising automatically adjusting at least one of the second set of candidate drillstring assemblies based on a violation detected by at least one engineering analysis that generates at least a portion of the engineering analysis information associated with the site;

generating a second final drillstring assembly based at least on the second proposed, validated set of drillstring assemblies and the second performance indexes, the generating the second final drillstring assembly comprising implementing an algorithm for making performance index tradeoffs, within the second proposed, validated set of drillstring assemblies, between at least two or more of a rate of penetration and risk performance index, a steerability performance index, or a stability performance index;

generating at least one operational parameter for operating the second final drillstring assembly, the at least one operational parameter being indexed with respect to depth of operation of the second final drillstring assembly; and iteratively repeating the re-training, receiving new well plan information, generating a new set of candidate drillstring assemblies, automatically performing simulations, automatically generating a new proposed, validated set of drillstring assemblies and performance indexes, generating a new final drillstring assembly, and generating at least one operational parameter for operating the new final drillstring assembly for each subsequent new section of the well at the site.

2. The method of claim 1, wherein each of the first and second final drillstring assemblies comprises a bottom hole assembly.

3. The method of claim 2, wherein the bottom hole assembly comprises a drill bit.

4. The method of claim 1, wherein:

the generating the first final drillstring assembly comprises selecting the first final drillstring assembly from the first proposed, validated set of drillstring assemblies; and the generating the second final drillstring assembly comprises selecting the second final drillstring assembly from the second proposed, validated set of drillstring assemblies.

5. The method of claim 1, wherein the algorithm comprises a Pareto Frontier algorithm.

6. The method of claim 1, further comprising accessing information associated with one or more of the offset wells in a field that includes the site.

7. The method of claim 6, further comprising generating the first and second sets of candidate drillstring assemblies based at least on the information associated with one or more of the offset wells in the field.

8. The method of claim 1, further comprising outputting the at least one drilling parameter indexed with respect to depth as a digital file.

9. The method of claim 1, further comprising outputting each of the first and second final drillstring assemblies as a respective digital file that specifies at least an order of components of the respective first and second final drillstring assemblies.

10. The method of claim 9, further comprising outputting the at least one drilling parameter indexed with respect to depth as part of the digital file.

11. The method of claim 1, further comprising:
rendering a graphical user interface to a display,
wherein the graphical user interface comprises graphical controls for at least two of the performance indexes.

12. The method of claim 11, further comprising:
receiving input associated with one or more of the graphical controls for selection of corresponding first and second performance index values; and
interactively generating the first and second final drillstring assemblies based at least on the input.

13. The method of claim 1 wherein the generating the sets of candidate drillstring assemblies, the performing simulations for the sets of candidate drillstring assemblies, the generating the proposed, validated sets of drillstring assemblies, and the generating the first and second final drillstring assemblies occurs automatically via a computing system.

14. The method of claim 1, wherein:
the performance indexes for each member of the first and second proposed, validated sets of drillstring assemblies comprises at least a rate of penetration and risk performance index, a steerability performance index, and a stability performance index;
the steerability performance index accounts for dog-leg severity; and
the stability performance index accounts for shock and vibration.

15. The method of claim 1, wherein the performance index tradeoffs further include a total cost.

16. A system, comprising:
one or more processors;
memory accessible by the one or more processors; and
processor-executable instructions stored in the memory and executable by the one or more processors to instruct the system to:
receive first well plan information for drilling at least a first section of a well at a site;
generate a first set of candidate drillstring assemblies using a knowledge base component that receives digital information from drilling jobs for other wells at other sites for training a neural network to generate a trained neural network, the trained neural network generating the first set of candidate drillstring assemblies based at least on at least a portion of the first well plan information and drillstring assembly component information;
automatically perform simulations for the first set of candidate drillstring assemblies to generate engineering analysis information associated with the site;
automatically generate a first proposed, validated set of drillstring assemblies and first performance indexes for each member of the first proposed, validated set of drillstring assemblies, the first proposed, validated set of drillstring assemblies and the first performance indexes being based at least on the first set of candidate drillstring assemblies and based at least on the engineering analysis information associated with the site, to automatically generate the first proposed, validated set of drillstring assembly comprising to automatically adjust at least one of the first set of candidate drillstring assemblies based on a violation detected by at least one engineering analysis that generates at least a portion of the engineering analysis information associated with the site;
generate a first final drillstring assembly based at least on the first proposed, validated set of drillstring assemblies and the first performance indexes, generating the first final drillstring assembly comprising implementing an algorithm for making performance index tradeoffs, within the first proposed, validated set of drillstring assemblies, between at least two or more of a rate of penetration and risk performance index, a steerability performance index, or a stability performance index;
generating at least one operational parameter for operating the first final drillstring assembly, the at least one operational parameter being indexed with respect to depth of operation of the first final drillstring assembly;
receive performance information from operation of the first final drillstring assembly in the first section of the well at the site;
re-train the trained neural network with the received performance information;
receive second well plan information for drilling at least a second section of the well at the site;
generate a second set of candidate drillstring assemblies using the knowledge base component, the trained neural network generating the second set of candidate drillstring assemblies based at least on at least a portion of the second well plan information and the drillstring assembly component information;
automatically perform simulations for the second set of candidate drillstring assemblies to generate engineering analysis information associated with the site;
automatically generate a second proposed, validated set of drillstring assemblies and first performance indexes for each member of the second proposed, validated set of drillstring assemblies, the second proposed, validated set of drillstring assemblies and the second performance indexes being based at least on the second set of candidate drillstring assemblies and based at least on the engineering analysis information associated with the site, to automatically generate the second proposed, validated set of drillstring assembly comprising to automatically adjust at least one of the second set of candidate drillstring assemblies based on a violation detected by at least one engineering analysis that generates at least a portion of the engineering analysis information associated with the site;
generate a second final drillstring assembly based at least on the second proposed, validated set of drillstring assemblies and the second performance indexes, generating the second final drillstring assembly comprising implementing an algorithm for making performance index tradeoffs, within the second proposed, validated set of drillstring assemblies, between at least two or more of a rate of penetration and risk performance index, a steerability performance index, or a stability performance index;
generating at least one operational parameter for operating the second final drillstring assembly, the at least one operational parameter being indexed with respect to depth of operation of the second final drillstring assembly; and
iteratively repeating the re-training, receiving new well plan information, generating a new set of candidate drillstring assemblies, automatically performing simulations, automatically generating a new proposed, validated set of drillstring assemblies and performance indexes, generating a new final drillstring assembly, and generating at least one operational parameter for operating the new final drillstring assembly for each subsequent new section of the well at the site.

17. A computing system comprising processor-based components, the processor-based components comprising:
a knowledge base component comprising at least one processor operatively coupled to at least one data storage device that receives digital information from drilling jobs for training a neural network to generate a trained neural network, the knowledge base component accessing at least a portion of data in the at least one data storage device and generating candidate bottom hole assemblies for drilling at least a first section of a well at a site using the trained neural network;
a tuning component comprising at least one processor, the tuning component automatically generating a first validated set of bottom hole assemblies as a subset of the candidate bottom hole assemblies via automated engineering violation detection based at least on automatically generated simulation results that simulate bottom hole assembly physics in at least a first portion of the well at the site;
an analysis component comprising at least one processor, the analysis component generating a first set of performance indexes and drilling parameters associated with at least a portion of the first validated set of bottom hole assemblies; and
a decision component comprising at least one processor, the decision component:
selecting one of the first validated set of bottom hole assemblies as a first optimal bottom hole assembly for drilling the first section of the well at the site via implementation of an algorithm for making performance index tradeoffs, within the first validated set of bottom hole assemblies, between at least two or more of a rate of penetration and risk performance index, a steerability performance index, or a stability performance index; and
generating at least one operational parameter for operating the selected one of the first validated set of bottom hole assemblies, the at least one operational parameter being indexed with respect to depth of operation of the selected one of the first validated set of bottom hole assemblies,
wherein the knowledge base component is further configured to:
receive performance information from operation of the selected one of the first validated set of bottom hole assemblies in the first section of the well at the site, and
re-train the trained neural network with the received performance information, wherein the tuning component is further configured to:
automatically generate a second validated set of bottom hole assemblies as a subset of the candidate bottom hole assemblies via automated engineering violation detection based at least on automatically generated simulation results that simulate bottom hole assembly physics in at least a second portion of the well at the site, different from the first portion of the well, and
generate a second set of performance indexes and drilling parameters associated with at least a portion of the second validated set of bottom hole assemblies, and wherein the decision component is further configured to:
select one of the second validated set of bottom hole assemblies as a second optimal bottom hole assembly for drilling the second section of the well at the site via implementation of an algorithm for making performance index tradeoffs, within the second validated set of bottom hole assemblies, between at least two or more of a rate of penetration and risk performance index, a steerability performance index, or a stability performance index, and
generate at least one operational parameter for operating the selected one of the second validated set of bottom hole assemblies, the at least one operational parameter being indexed with respect to depth of operation of the selected one of the second validated set of bottom hole assemblies, and
wherein, for each subsequent new section of the well at the site, the system is configured to iteratively repeat:
receiving new performance information from operation of an immediately final bottom hole assembly in an immediately previous section of the well at the site,
re-training the trained neural network with the received new performance information,
generating a new validated set of bottom hole assemblies as a subset of the candidate bottom hole assemblies via automated engineering violation detection based at least on automatically generated simulation results that simulate bottom hole assembly physics in a new portion of the well at the site,
selecting one of the new validated set of bottom hole assemblies as a new optimal bottom hole assembly for drilling the new section of the well at the site,
generating a new final drillstring assembly, and
generating at least one operational parameter for operating the selected one of the new validated set of bottom hole assemblies.

18. The system of claim 17, wherein the algorithm comprises a Pareto Frontier algorithm for selection of each of the one of the first and second validated sets of bottom hole assemblies.

19. The system of claim 17, further comprising:
a graphical user interface component that renders a graphical user interface to a display,
wherein the graphical user interface comprises at least one performance index graphical control that receives input for adjusting a weight of the at least one performance index, and
wherein the decision component selects:
the one of the first validated set of bottom hole assemblies as a first optimum bottom hole assembly based at least on the input, and
the one of the second validated set of bottom hole assemblies as a second optimum bottom hole assembly based at least on the input.

20. The system of claim 17, further comprising:
an interface operatively coupled to a well planning framework,
wherein the knowledge base component:
receives respective well plan information for each section of the well at the site from the well planning framework via the interface, and
generates the respective candidate bottom hole assemblies for drilling each respective section of the well at the site based at least on the respective well plan information.

* * * * *